United States Patent [19]

Ohyama et al.

[11] Patent Number: 4,908,723
[45] Date of Patent: Mar. 13, 1990

[54] COMPACT RECORDING AND/OR REPRODUCING APPARATUS WITH OBLIQUE ROTARY HEAD

[75] Inventors: Masao Ohyama; Tsuyoshi Nagasawa, both of Tokyo, Japan

[73] Assignee: Sony Corporation, Tokyo, Japan

[21] Appl. No.: 827,640

[22] Filed: Feb. 10, 1986

[30] Foreign Application Priority Data

Feb. 14, 1985 [JP] Japan ................... 60-27374

[51] Int. Cl.[4] ............................. G11B 15/61
[52] U.S. Cl. ...................... 360/85; 360/95
[58] Field of Search ............ 360/85, 95, 130.21, 360/130.24, 73, 74.1, 74.2, 84

[56] References Cited

U.S. PATENT DOCUMENTS 4,126,888 11/1978 Hayashi et al. ............... 360/85
4,383,282 5/1983 Osanai ........................ 360/74.1

FOREIGN PATENT DOCUMENTS 0071975 2/1983 European Pat. Off. .
0083932 7/1983 European Pat. Off. .
0125700 11/1983 European Pat. Off. .
0160822 11/1985 European Pat. Off. .
0145605 12/1978 Japan ............................ 360/85
0169957 10/1982 Japan ............................ 360/85
0200404 11/1983 Japan ............................ 360/85
2140960 12/1984 United Kingdom .
2155905 10/1985 United Kingdom .

Primary Examiner—Stuart N. Hecker
Assistant Examiner—David J. Severin
Attorney, Agent, or Firm—Ronald P. Kananen

[57] ABSTRACT

A recording and/or reproducing apparatus for a magnetic tape cassette has a rotary head mounted on the recording and/or reproducing apparatus and a loading mechanism for extracting a length of magnetic tape from a magnetic tape cassette and moving the length of magnetic tape to various positions corresponding to various operation modes of the recording and reproducing apparatus. The loading mechanism includes first and second movable members respectively movable along predetermined first and second paths. The rotary head is mounted in such a manner that the axis of the rotary head assembly lies oblique to a vertical axis in such a manner that first ends of the first and second paths lie adjacent the rotary head in a plane extending through the uppermost point and the lowermost point of the top surface of the rotary head and perpendicular to the medial plane of the magnetic tape and second ends of the first and second paths are remote from the rotary head, whereby the difference between the lengths of the first and second paths can be minimzied. Preferably, the rotary head is mounted in such a manner that the axis of the rotary head means lies oblique to the vertical axis such that the plane extending through the uppermost point and the lowermost point of the top surface of the rotary head means lies oblique to a reference line connecting the reel axes of a pair of tape reels in the magnetic tape cassette.

41 Claims, 17 Drawing Sheets

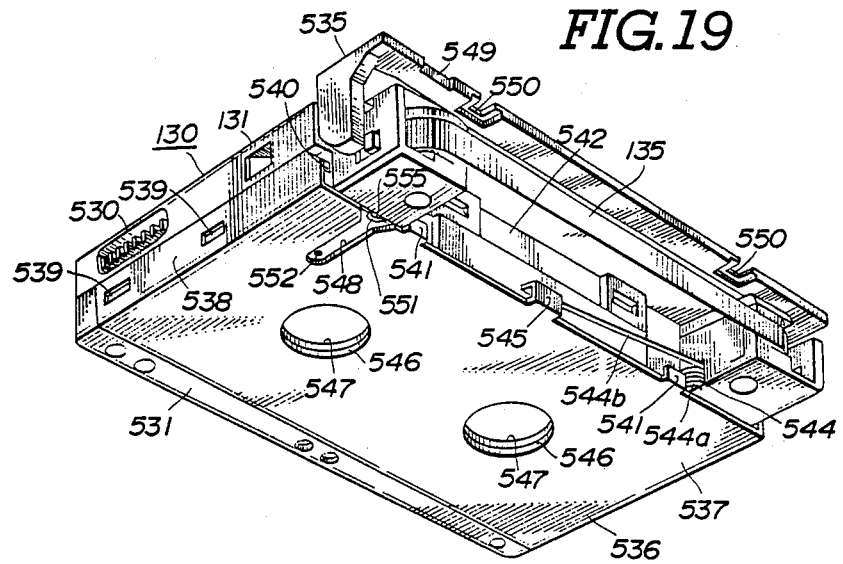
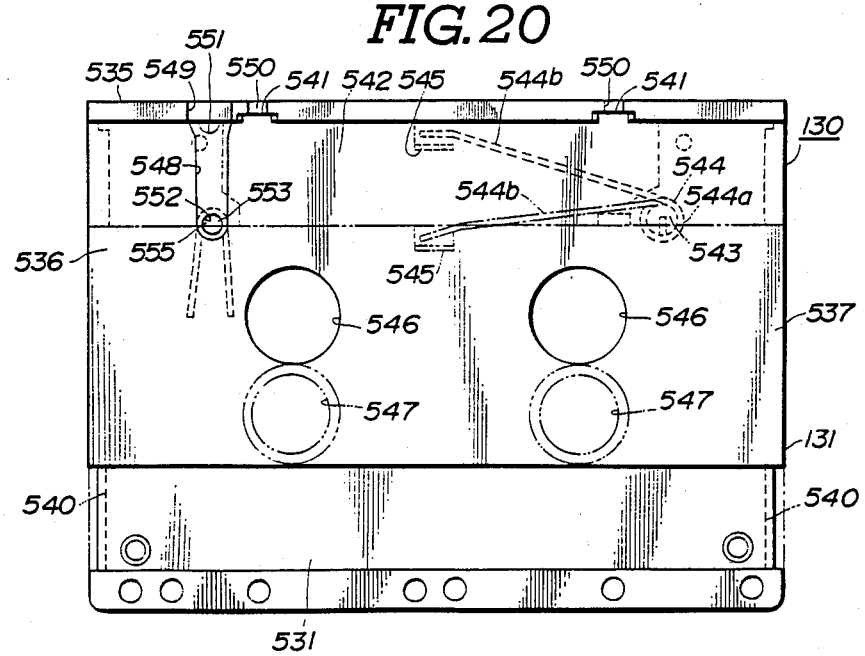

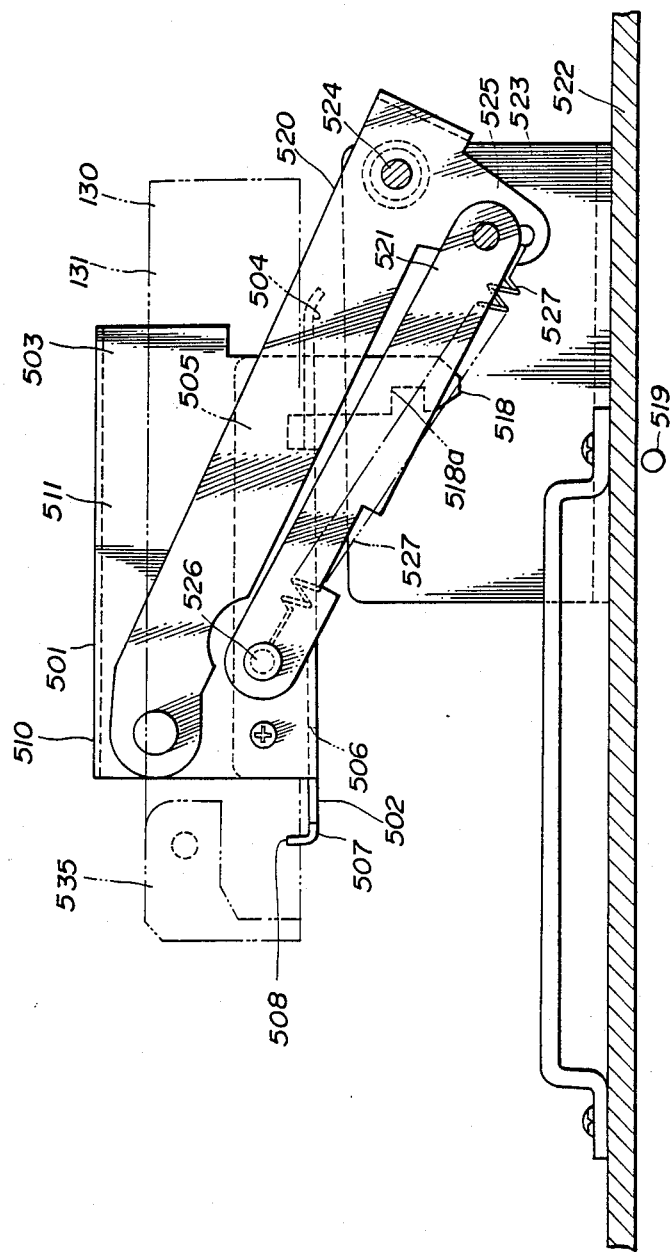

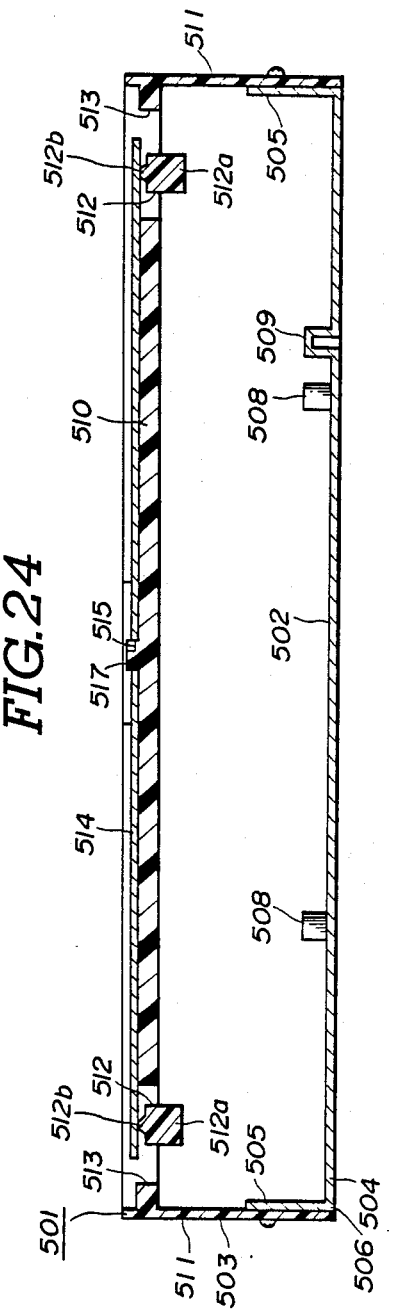
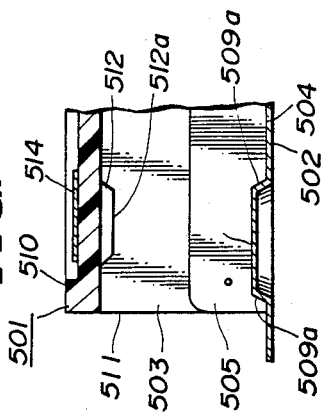
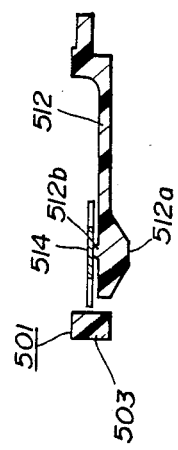

COMPACT RECORDING AND/OR REPRODUCING APPARATUS WITH OBLIQUE ROTARY HEAD

BACKGROUND OF THE INVENTION

The present invention relates generally to a recording and/or reproducing apparatus for a magnetic tape cassette, such as a magnetic tape cassette specifically suited for pulse-code modulated (PCM) recording and reproduction. More specifically, the invention relates to the construction of the recording and/or reproducing apparatus including a rotary head, a loading mechanism and so forth, which construction allows the recording and/or reproducing apparatus to be more compact.

In recent years, various magnetic tape cassettes applicable to recording and/or reproducing apparatus with rotary heads have been proposed. The construction of one typical magnetic tape cassette recently developed and proposed and applicable to recording and/or reproducing apparatus of the type having a rotary head is disclosed in the European Patent First Publication No. 01 60 822, published Nov. 13, 1985, and the British Patent First Publication No. 2,155,905, published Oct. 2, 1985. The recording and/or reproducing apparatus includes a tape loading system. This tape loading apparatus extracts magnetic tape from the magnetic tape cassette and moves the extracted length of tape to various predetermined positions relative to the rotary head according to the selected operating mode of the recording and/or reproducing apparatus.

Conventionally, it has been considered difficult to make this rotary-head-type recording and/or reproducing apparatus satisfactorily compact due to the many relatively complicated mechanisms, such as the tape loading mechanism, a brake mechanism, a drive motor and power train, and so on.

As is well known, the loading mechanism includes movable blocks movable along predetermined paths. The blocks have structural elements which initially reach behind the magnetic tape and which draw the tape out of the cassette as the blocks move away from the cassette. At the block position where tape loading is completed, the magnetic tape has to be wound around at least half the circumference of the rotary head. Therefore, at the loading-completed position, the movable blocks have to be at least on diametrically opposite sides of the center of the rotary head. Generally, the rotary head is mounted on a mechanical chassis at a position laterally offset from the longitudinal center axis thereof. On the other hand, the front ends of the predetermined paths of the movable blocks generally lie closer to the longitudinal center axis. This means that the lengths of the paths through which the movable blocks have to travel differ, so that the movable blocks must cover different distances to reach their respective positions. This requires rather a complicated drive arrangement for simultaneously driving the movable blocks through different strokes.

Furthermore, the recording and/or reproducing apparatus must have sufficient space on both lateral sides of the rotary head for the movable blocks. This limits the lateral compactness of the recording and/or reproducing apparatus. On the other hand, the rotary head must be far enough from the cassette, i.e. from the front ends of the movable block paths, that the other ends of the paths can lie close to the rotary head without interfering with its rotation. This limits the longitudinal compactness of the recording and/or reproducing apparatus.

In addition, the recording and/or reproducing apparatus of this type requires a operation mode switching mechanism including a brake mechanism for providing a braking force for restricting or limiting rotation of the tape reels and a tape tension control mechanism for controlling the tension on the magnetic tape. Conventionally, this operation mode switching mechanism has been in the form of a control mechanism independent of the loading mechanism. This makes the recording and/or reproducing apparatus complicated and thus limits the compactness of the recording and/or reproducing apparatus.

SUMMARY OF THE INVENTION

Therefore, it is a principle object of the present invention to provide a recording and/or reproducing apparatus which is satisfactorily compact.

Another and more specific object of the present invention is to provide a simplified construction of the recording and/or reproducing apparatus.

In order to accomplish the aforementioned and other objects, a recording and/or reproducing apparatus for a magnetic tape cassette, according to the present invention, has a rotary head mounted on the recording and/or reproducing apparatus and a loading mechanism for extracting a length of magnetic tape from a magnetic tape cassette and moving the length of magnetic tape to various positions corresponding to various operation modes of the recording and reproducing apparatus. The loading mechanism includes first and second movable members respectively movable along predetermined first and second paths. The rotary head is mounted in such a manner that the axis of the rotary head assembly lies obliquely to a vertical axis in such a manner that first ends of the first and second paths lie adjacent the rotary head means in a plane extending through the uppermost point and the lowermost point of the top surface of the rotary head means and perpendicular to the medial plane of the magnetic tape, and the second ends of the first and second paths are remote from the rotary head means and proximal to the first means, whereby the difference between the lengths of the first and second paths can be minimized.

In accordance with the preferred construction, the rotary head is mounted in such a manner that the axis of the rotary head means lies obliquely to the vertical axis such that the plane extending through the uppermost point and the lowermost point of the top surface of the rotary head means lies obliquely to a reference line connecting the reel axes of a pair of tape reels in the magnetic tape cassette.

In this recording and/or reproducing apparatus construction, the first ends of the first and second paths are longitudinally offset from the center of the rotary head. As a result, the space required to the lateral sides of the rotary head is reduced, thus reducing the required lateral width of the recording and/or reproducing apparatus. In addition, by minimizing the difference between the lengths of the first and second paths, the difference between the strokes of the first and second movable blocks at various operation modes of the recording and/or reproducing apparatus can be reduced. This helps simplify the driving mechanism of the loading mechanism.

In the preferred embodiment, the recording and/or reproducing apparatus is provided with a driving mechanism associated with the aforementioned loading mechanism for driving the first and second movable members along the first and second paths according to the operational mode of the recording and reproducing apparatus. The driving mechanism includes a loading motor driven to shift the first and second movable members among various mode positions corresponding to the operational modes of the recording and/or reproducing apparatus, and a power train adapted to move the first and second members of the second means at different speeds so as to compensate for the difference between the strokes of the first and second members.

Alternatively, in order to accomplish the aforementioned and other object of the invention, a recording and/or reproducing apparatus for a magnetic tape cassette, according to the invention, is provided with an operation mode switching mechanism including a brake mechanism associated with the reel bases, and cooperative with at least one of the first and second loading rings, for applying brakes to the reel bases at various braking magnitudes so as to restrict rotation of the reel base in a first braking mode, for exerting resistance to rotation of the reel base but allowing rotation of the reel base at a limited speed in a second brake mode, and for allowing free rotation of the reel bases in a third brake mode, the brake mechanism being cooperative with the second means for varying the braking mode among the first, second and third braking modes according to the position of the second means corresponding the operation mode of the recording and/or reproducing apparatus.

In practice, the operation mode switching mechanism also includes a magnetic tape tension regulator means adapted to regulate the tension on the magnetic tape while the recording and/or reproducing apparatus is in at least one preselected mode of operation, e.g. in a PLAY mode, a RECORD mode and so forth. The magnetic tape tension regulator means is cooperative with a slider which couples the aforementioned brake mechanism to the loading mechanism, so as to be actuated to a position in which it regulates tape tension at the specific slider position corresponding to the preselected operational mode of the recording and/or reproducing apparatus.

Coupling the operation mode switching mechanism to the loading mechanism simplifies the recording and/or reproducing apparatus structure significantly and so helps make the recording and/or reproducing apparatus more compact.

According to one aspect of the invention, a recording and/or reproducing apparatus for a magnetic tape cassette comprises first means for receiving the magnetic tape cassette to drivingly cooperate therewith, a rotary head means adapted to record and/or reproduce signals on the magnetic tape, second means for extracting a length of magnetic tape from the magnetic tape cassette and moving the length of magnetic tape to various positions corresponding to various operation modes of the recording and reproducing apparatus, the second means including first and second movable members respectively movable along predetermined first and second paths, third means for mounting the rotary means on the recording and/or reproducing apparatus such that the axis of the rotary head assembly lies obliquely to a vertical axis in such a manner that first ends of the first and second paths lie adjacent the rotary head means in a plane extending through the uppermost point and the lowermost point of the top surface of the rotary head means, and proximal to the first means, whereby the difference between the lengths of the first and second paths can be minimized, and fourth means for driving recording and/or reproducing apparatus through various modes of operation, the fourth means actuating the second means so as to shift the first and second members along the first and second paths to an extent in accordance with the operational mode of the recording and reproducing apparatus.

The third means mounts the rotary head means in such a manner that the axis of the rotary head means lies obliquely to the vertical axis such that a plane extending through the uppermost point and the lowermost point of the top surface of the rotary head means lies obliquely to a reference line connecting the reel axes of a pair of tape reels in the magnetic tape cassette. The fourth means shifts the first and second members along the first and second paths simultaneously. For this purpose, the fourth means moves the first and second members of the second means at different speeds so as to compensate for the difference between the strokes of the first and second members according to the difference between the lengths of the first and second paths.

The recording and/or reproducing apparatus further comprises a mechanical chassis mounting the rotary head means thereon and defining the first and second paths for the first and second members such that the first end of the first path lies near one longitudinal edge of the mechanical chassis such that the first ends of the first and second paths lie on diametrically opposite sides of the rotary head means, and such that the longitudinal distance between the first means and the first end of the first path is less than that between the first means and the first end of the second path. The first and second members of the second means each comprise loading posts engageable with the magnetic tape within the magnetic tape cassette for extracting a length of magnetic tape as the first and second members are shifted from the second ends toward the first ends of the first and second path. The second means further comprises first and second loading rings cooperative with the first and second members respectively and rotatable about the vertical axis extending through the center of the rotary head assembly, the first and second loading rings being adapted to be driven by a loading motor through a power train so as to shift the first and second members between the first and second ends of the first and second paths according to rotation thereof.

The power train is adapted to drive the first and second loading rings at different speeds, which speed difference compensates for the difference between the strokes of the first and second members due to the difference between the lengths of the first and second path.

The recording and/or reproducing apparatus further comprises a brake mechanism associated with a reel base in the first means engageable with a tape reel housed in a cassette casing of the magnetic tape cassette, and means cooperative with at least one of the first and second loading rings for operating the brake mechanism to various mode positions corresponding to the angular positions of the first and second loading rings so as exert a corresponding braking force on the reel base.

According to another aspect of the invention, a loading mechanism of a recording and reproducing apparatus including a rotary head having a magnetic head rotatable with a rotary drum having an essentially flat top surface comprises first means for receiving the magnetic tape cassette to drivingly cooperate therewith, the first means including a pair of reel bases engageable to a pair of tape reels housed in a cassette casing of the magnetic tape cassette, second means for extracting a length of magnetic tape wound around the tape reels in the magnetic tape cassette and moving the length of magnetic tape to various positions corresponding to various operation modes of the recording and reproducing apparatus, the second means including first and second movable members respectively movable to various mode positions according to the operation mode of the recording and/or reproducing apparatus along respectively corresponding predetermined first and second paths, which paths have first ends located near the rotary head and second ends remote from the rotary head and proximal to the first means, third means for mounting the rotary head on the recording and/or reproducing apparatus such that the flat top surface lies obliquely to a horizontal plane and the axis of rotation of the rotary head assembly lies obliquely to a vertical axis in such a manner that the first ends of the first and second paths and a reference line connecting the uppermost point and the lowermost point on the top surface lie in the same vertical plane, and such that the difference between the lengths of the first and second paths can be minimized, and fourth means for driving the second means so as to shift the first and second members along the first and second paths according to the operational mode of the recording and reproducing apparatus.

The fourth means further comprises first and second loading rings cooperative with the first and second members respectively and rotatable about the vertical axis extending through the center of the rotary head assembly, the first and second loading rings being adapted to be driven by a loading motor through a power train so as to shift the first and second members between the first and second ends of the first and second paths according to rotation thereof.

According to a further aspect of the invention, a recording and/or reproducing apparatus for a magnetic tape cassette comprises a rotary head having a magnetic head rotatable with a rotary drum having an essentially flat top surface, first means for receiving the magnetic tape cassette to drivingly cooperate therewith, the first means including a pair of reel bases engageable to a pair of tape reels housed in a cassette casing of the magnetic tape cassette, second means for extracting a length of magnetic tape wound around the tape reels in the magnetic tape cassette and moving the length of magnetic tape to various positions corresponding to various operation modes of the recording and reproducing apparatus, the second means including first and second movable members respectively movable to various mode positions according to the operation mode of the recording and/or reproducing apparatus along respectively corresponding predetermined first and second paths, which paths have first ends located near the rotary head and second ends remote from the rotary head and proximal to the first means, third means for mounting the rotary head on the recording and/or reproducing apparatus such that the flat top surface lies obliquely to a horizontal plane and the axis of rotation of the rotary head assembly lies obliquely to a vertical axis in such a manner that the first ends of the first and second paths and a reference line connecting the uppermost point and the lowermost point on the top surface lie in the same vertical plane, and fourth means, associated with the reel bases, and cooperative with at least one of the first and second loading rings, for applying brakes to the reel bases at various braking magnitudes so as to restrict rotation of the reel base in a first braking mode, for exerting resistance to rotation of the reel base but allowing rotation of the reel base at a limited speed in a second brake mode, and for allowing free rotation of the reel bases in a third brake mode, the brake mechanism being cooperative with the second means for varying braking mode among the first, second and third brake modes according to the position of the second means corresponding the operation mode of the recording and/or reproducing apparatus, and fifth means for driving recording and/or reproducing apparatus through various modes of operation, the fourth means actuating the second means so as to shift the first and second members along the first and second paths according to the operational mode of the recording and reproducing apparatus.

The fifth means further comprises first and second loading rings cooperative with the first and second members respectively and rotatable about the vertical axis extending through the center of the rotary head assembly, the first and second loading rings being adapted to be driven by a loading motor through a power train so as to shift the first and second members between the first and second ends of the first and second paths according to rotation thereof. The fourth means comprises first and second brake arms having first and second brake shoes independently movable toward and away from the outer periphery of the reel base to realize the first, second and third brake modes. The fourth means further comprises cooperation means coupling at least one of the first and second loading rings with the first and second arms for controlling the positions of the first and second brake arms according to the angular position of the one of first and second loading rings. The cooperation means comprises a slider extending substantially along one edge of the mechanical chassis and movable according to angular movement of the one of the first and second loading rings to control the positions of the first and second brake arms.

According to the preferred embodiment, the cooperation means further comprises a pivotal lever associated with the slider at one end and associated with the first and second brake arms at the other end.

The recording and/or reproducing apparatus further comprises sixth means adapted to regulate the tension on the magnetic tape while the recording and/or reproducing apparatus is in at least one preselected mode of operation. The sixth means is cooperative with the slider to be actuated to a position in which it regulates tape tension at the specific slider position corresponding to the preselected operational mode of the recording and/or reproducing apparatus.

According to a yet further aspect of the invention, a recording and/or reproducing apparatus for a magnetic tape cassette comprises a rotary head having a magnetic head rotatable with a rotary drum having an essentially flat top surface, first means for receiving the magnetic tape cassette to drivingly cooperate therewith, the first means including a pair of reel bases engageable to a pair of tape reels housed in a cassette casing of the magnetic tape cassette, second means for extracting a length of magnetic tape wound around the tape reels in the magnetic tape cassette and moving the length of magnetic tape to various positions corresponding to various operation modes of the recording and reproducing apparatus, the second means including first and second movable members respectively movable to various mode positions according to the operation mode of the recording and/or reproducing apparatus along respectively corresponding predetermined first and second paths, which paths have first ends located near the rotary head and second ends remote from the rotary head and proximal to the first means, third means for mounting the rotary head on the recording and/or reproducing apparatus such that the flat top surface lies obliquely to a horizontal plane and the axis of rotation of the rotary head assembly lies obliquely to a vertical axis in such a manner that the first ends of the first and second paths and a reference line connecting the uppermost point and the lowermost point on the top surface lie in the same vertical plane, and fourth means for driving recording and/or reproducing apparatus through various modes of operation, the fourth means actuating the second means so as to shift the first and second members along the first and second paths according to the operational mode of the recording and reproducing apparatus, the fourth means including a loading motor driven to shift the first and second movable members among various mode positions corresponding to the operational modes of the recording and/or reproducing apparatus, and a power train adapted to move the first and second members of the second means at different speeds so as to compensate for the difference between the strokes of the first and second members.

The power train comprises first and second rotary blocks, the first rotary block being adapted to drive the first loading ring at a first predetermined speed, and the second rotary block being adapted to drive the second loading ring at a second predetermined speed.

According to one embodiment of the invention, the first and second loading rings have gear teeth on their outer peripheries, and the first and second rotary blocks have first and second driving gears respectively engageable with the gear teeth of the first and second loading rings. The power train further includes a driving shaft driven by the loading motor and a worm gear adapted to be driven the driving shaft. The first rotary block has a worm wheel to be driven by the worm gear and thus is coupled with the second rotary block to drive the latter. The first and second driving gears of the first and second rotary blocks have substantially the same gear ratio. The first and second rotary blocks have first and second transmission gears having gear ratios selected to provide the differential shifting speed of the first and second members of the second means.

In an alternative embodiment of the invention, the first and second driving gears of the first and second rotary blocks have substantially the same gear ratio, and the first rotary block has a transmission gear engageable with the second driving gear of the second rotary block and having a smaller diameter than the second driving gear, the diameters of the first and second transmission gears being selected to provide the differential shifting speed of the first and second members of the second means.

In another alternative embodiment, the first and second driving gears of the first and second rotary blocks have substantially the same gear ratio, and the first rotary block has a transmission gear engageable with the second driving gear of the second rotary block and having a greater diameter than the second driving gear, the diameters of the first and second transmission gears being selected to provide the differential shifting speed of the first and second members of the second means.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings:

FIG. 19 is a view similar to FIG. 18 but showing the closure lid and sliding members at their open positions;

FIG. 20 is a bottom view of the magnetic tape cassette of FIG. 17;

FIG. 21 is a side elevation of the preferred embodiment of a cassette holder in a recording and reproducing apparatus for a magnetic tape cassette, according to the invention;

FIG. 24 is a cross-section through the cassette holder taken along line XXIV—XXIV in FIG. 22;

FIG. 25 is a section taken along line XXV—XXV of FIG. 22; and

FIG. 26 is a section taken along line XXVI—XXVI of FIG. 22.

DESCRIPTION OF THE PREFERRED EMBODIMENTS

Referring now to FIGS. 1 to 6, the preferred embodiment of a recording and/or reproducing apparatus 1 has a mechanical chassis 2.

Figure 1:
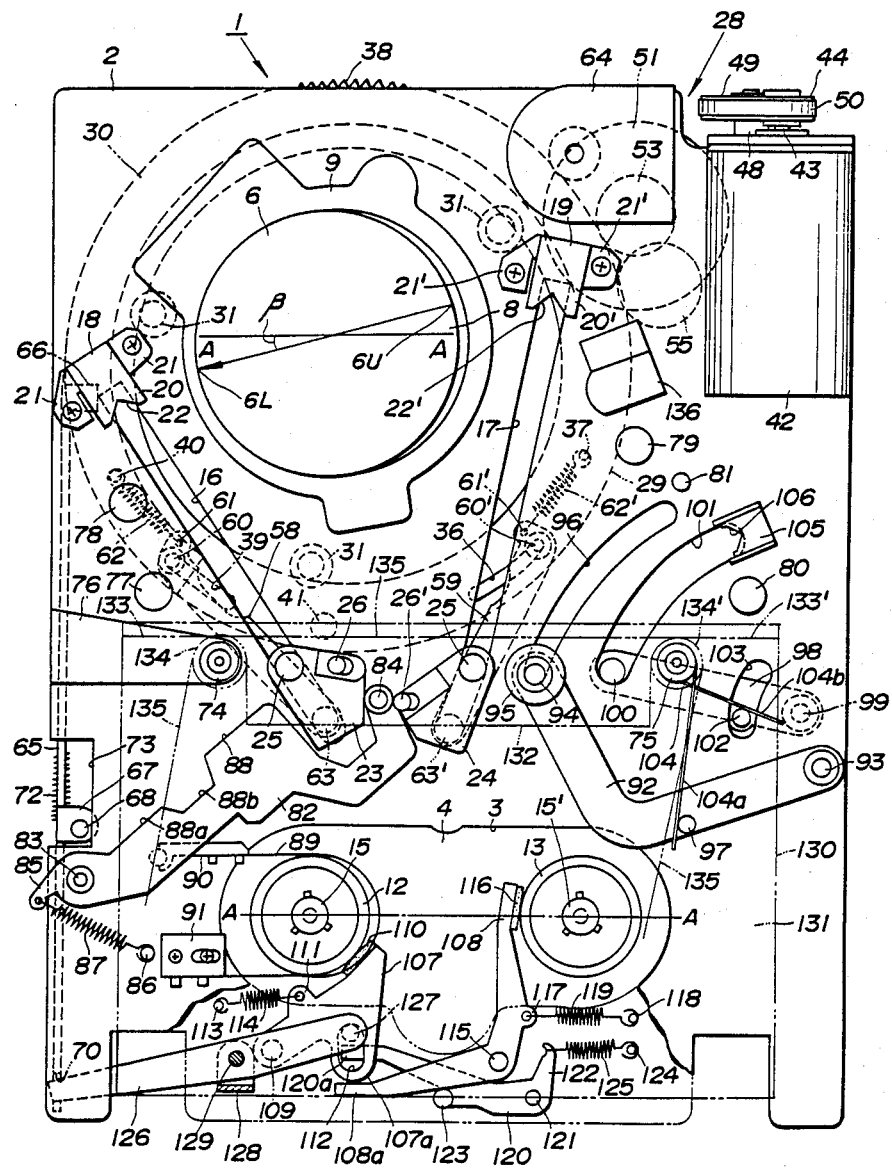
FIG. 1 is a plan view of a mechanical chassis implementing the preferred embodiment of a recording and/or reproducing apparatus for a magnetic tape, according to the invention, the mechanical chassis being shown while not in use.

It should be appreciated that, throughout the disclosure given herebelow, the word "front" represents the section illustrated in the lower half of FIG. 1, the word "rear" represents the section illustrated in the upper half of FIG. 1, and the words "right" and "left" represent the corresponding sides, i.e. the right- and left-hand sides of FIG. 1.

Figure 3:
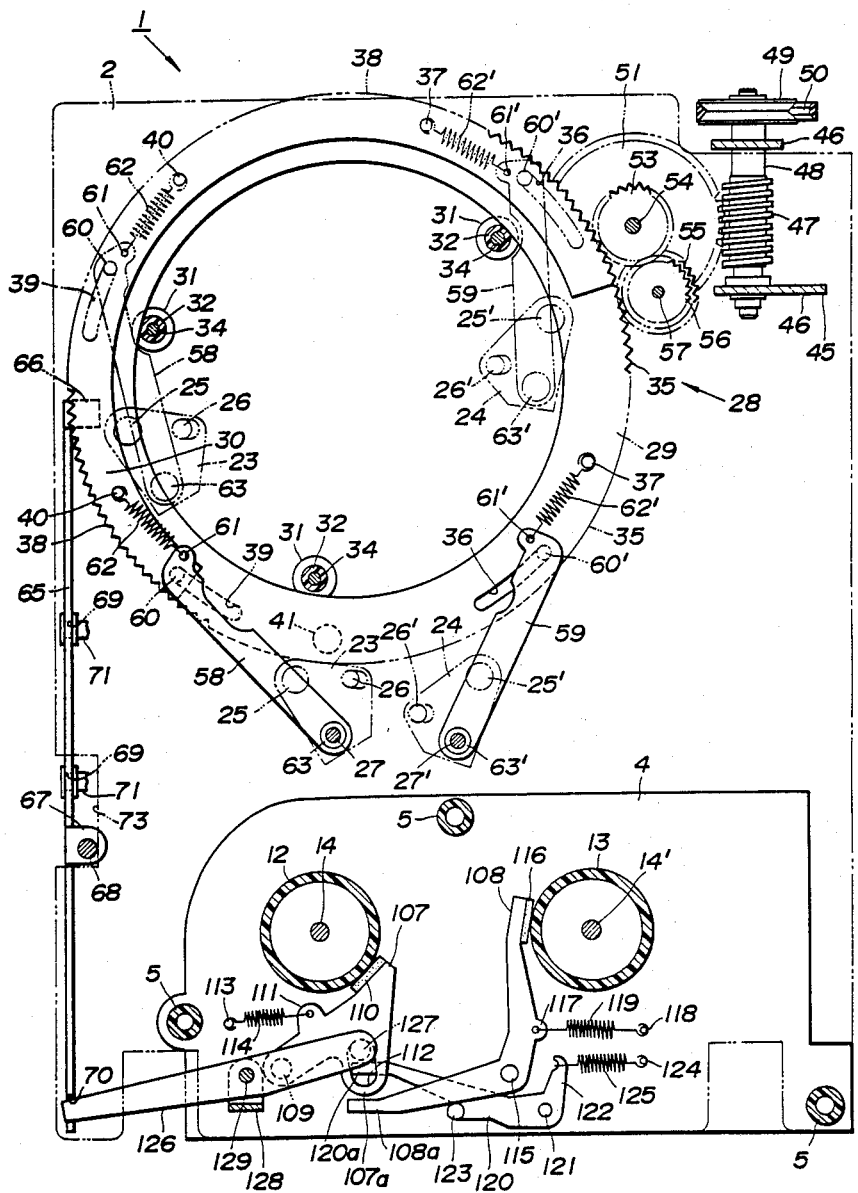
FIG. 3 is a plan view showing components of the recording and/or reproducing apparatus lying below the mechanical chassis.

The mechanical chassis 2 has a cut-out 3 accommodating reel bases 12 and 13 near its front end. The cut-out 3 is enclosed, elongated left-to-right and has semi-circular ends. The reel bases 12 and 13 are centered in the opposite ends of the cut-out 3. As best shown in FIG. 3, a sub-chassis 4 is mounted beneath the mechanical chassis 2 on support posts 5. The supporting posts 5 serve as spacers holding the sub-chassis 4 in a fixed positional relationship with the mechanical chassis. Accordingly, the length of the supporting posts 5 corresponds to the desired distance between the mechanical chassis 2 and the sub-chassis 4.

Figure 5:
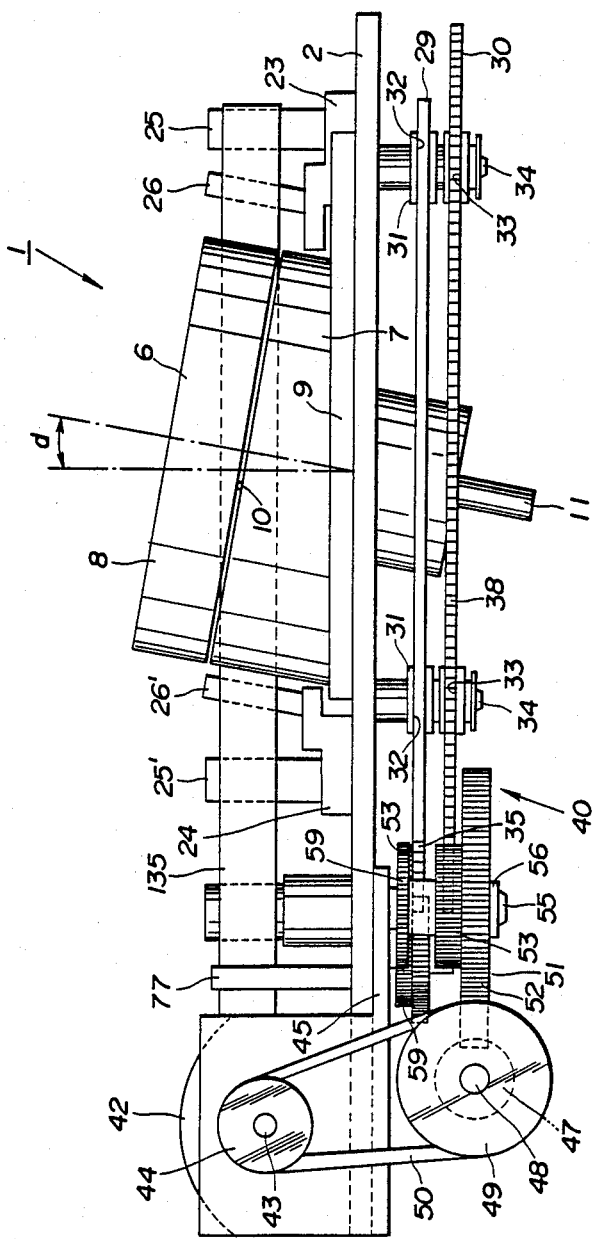
FIG. 5 is a side elevation of the mechanical chassis of FIG. 2, showing the magnetic tape loaded onto the rotary drum.

A rotary head assembly 6 is mounted near the rear end of the mechanical chassis 2. As is apparent from FIGS. 1 and 2, the rotary head assembly 6 is slightly offset from the longitudinal axis of the mechanical chassis 2. As shown in FIG. 5, the rotary head assembly 6 comprises a lower stationary drum 7 and an upper rotary drum 8. The lower stationary drum 7 is fixed to the mechanical chassis 2 through a drum base 9. The upper rotary drum 8 is rotatably supported above the lower stationary drum 7. The rotary drum 8 mounts one or more magnetic heads 10 for rotation therewith.

Although it is not clearly shown in the drawings, the lower stationary drum 7 has a thin cut-out which constitutes a lead section for guiding a magnetic tape 135 as it runs over the rotary head assembly 6. The lead section is formed in the outer periphery of the lower stationary drum 7 and substantially directed frontwardly. The lead section on the lower stationary drum 7 accurately guides the magnetic tape into contact with the rotary drum assembly 6.

The upper rotary drum 8 is rigidly connected to a drive shaft 11 (FIG. 5). The drive shaft 11 extends along the axis of the rotary drum assembly 6 and downwardly through the mechanical chassis 2. Beneath the mechanical chassis and within the space between the mechanical chassis and the sub-chassis 4, the drive shaft 11 is drivingly associated with a rotary head drive mechanism, which is of conventional construction and will not be discussed further. Therefore, the rotary head drive mechanism has been neglected from the drawings for simplification of the drawings and disclosure.

As is apparent from FIG. 5, the axis of the rotary head assembly 6 lies obliquely to a vertical axis perpendicular to the plane of the mechanical chassis, by a predetermined inclination angle α. The inclination angle α will be hereafter referred to as a "first inclination angle". Also, the axis of the rotary head assembly 6 lies oblique to a vertical plane passing through the center of the rotary head assembly and lying parallel to the axis between the centers of the reel bases, by a predetermined inclination angle β, as best sen in FIG. 1. The inclination angle β will be hereafter referred to as a "second inclination angle". Due to the first and second inclination angles α and β, the magnetic head 10 lies with its lowermost point 6L forward of the plane A—A along the vector β, and its uppermost point 6U rearward of the plane A—A. The magnetic heads 10 thus move vertically between the lowermost point 6L and the uppermost point 6U as they rotate with the upper rotary drum 8. This causes the magnetic heads 10 to track along a magnetic tape 135 obliquely to the longitudinal axis of the tape. The angle of inclination of the magnetic head trace on the magnetic tape 135 lies within a known range determined by the first inclination angle α.

The first inclination angle α lies within an angular range known in the prior art. On the other hand, in practice, the second inclination angle β is preferably approximately 10°.

Figure 2:
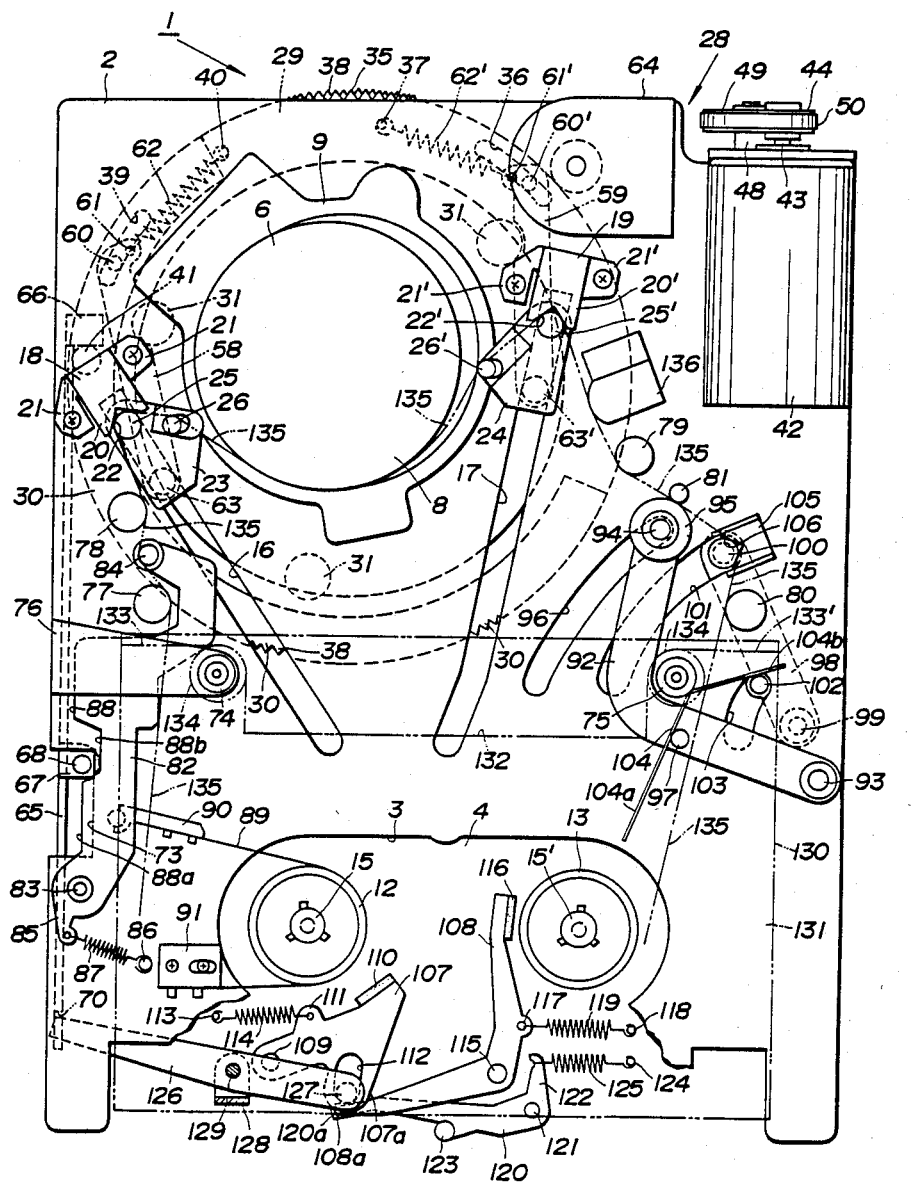
FIG. 2 is a plan view similar to FIG. 1, but showing the mechanical chassis while operating in a PLAY mode.
Figure 6:
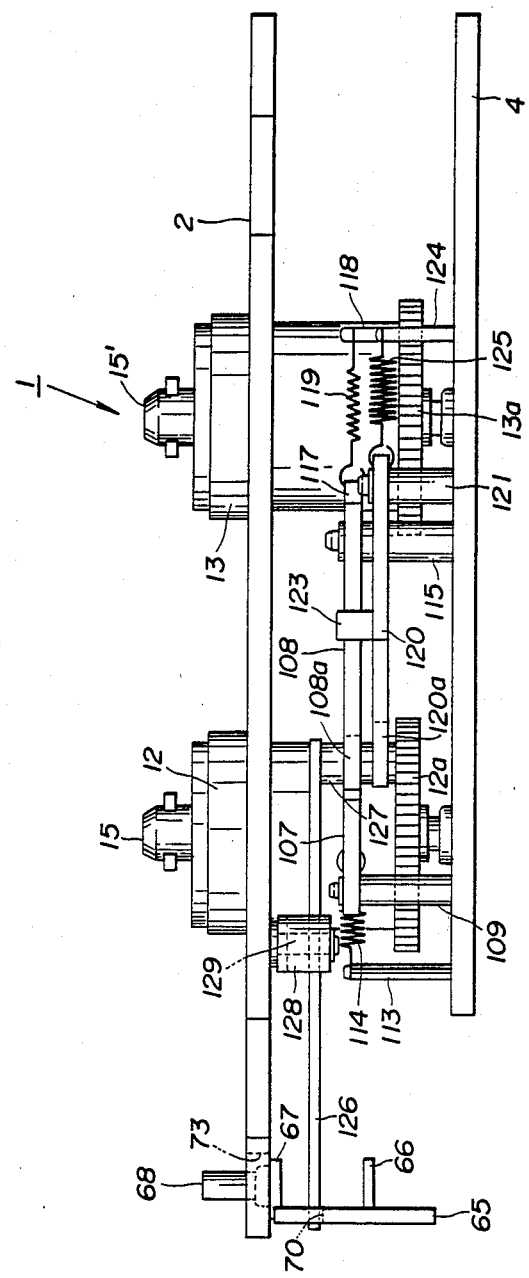
FIG. 6 is a front elevation of the mechanical chassis when unloaded.

The reel bases 12 and 13 are separated from each other by a distance corresponding to the distance between the axes of the tape reels of a magnetic tape cassette or cartridge. The reel bases 12 and 13 are rotatably connected to reel base supports 14 and 14' (FIG. 3). The reel bases 12 and 13 are essentially cylindrical and respectively have reel shafts 15 and 15' on their upper surfaces (FIGS. 1, 2). The reel shafts 15 and 15' are axially aligned with the vertical center axes of the reel bases 12 and 13 and are designed to engage the tape reels of the magnetic tape cassette or cartridge. The upper sections of the reel bases 12 and 13 and the reel shafts 15 and 15' extend upward through the cut-out 3 and project above the mechanical chassis 2, as seen in FIG. 6. The lower ends of the reel bases 12 and 13 lie within the space between the mechanical chassis 2 and the sub-chassis 4 and are provided with driving gears 12a and 13a. The driving gears 12a and 13a are associated with a known tape drive mechanism through an appropriate power train which selectively drives one of the reel bases 12 and 13 according to a selected operation mode of the recording and/or reproducing apparatus.

It should be noted that the tape drive mechanism and power train for selectively driving one of the reel bases 12 and 13 through the driving gears 12a and 13a are per se well known and need not be discussed further. Therefore, in order to simplify the drawings and disclosure, they are neglected from the drawings and disclosure. However, it should be appreciated that the present invention will be applicable to any type of the recording and/or reproducing apparatus having any type of tape driving mechanism and power train.

In the shown embodiment, the reel shaft 15 of the reel base 12 is designed to engage a supply reel of the magnetic tape cassette, from which the magnetic tape 135 is unwound as the tape is fed in a forward direction. On the other hand, the reel shaft 15' of the reel base 13 is designed to engage a receiving reel of the magnetic tape cassette, around which the magnetic tape 135 is wound while the magnetic tape is fed in the forward direction. Therefore, when the recording and/or reproducing apparatus is operating in a forward tape-feed mode, such as when in a PLAY mode, a fast-forward (F/F) mode, a RECORD mode and the like, the reel base 13 is driven by the driving mechanism through the power train and the driving gear 13a. On the other hand, while the recording and/r reproducing apparatus is operating in a reverse tape-feed mode, such as when in a REWINDING mode, the reel base 12 is driven by the driving mechanism through the power train and the drive gear 12a.

As shown in FIGS. 1 and 2, the mechanical chassis 2 also has a pair of elongated guide holes 16 and 17. The guide hole 16 and 17 respectively guide movement of movable blocks 23 and 24 of a loading mechanism. The rear ends of the guide holes 16 and 17 are located on opposite sides of the rotary head assembly 6. The distance between the guide holes 16 and 17 is greatest at their rear ends and gradually decreases toward the front so as to define a generally V-shaped path for the movable blocks 23 and 24. The guide hole 16 is substantially straight throughout its length. On the other hand, the front end of the guide hole 17 doglegs slightly toward the guide hole 16.

The front ends of the guide holes 16 and 17 lie near the reel base cut-out 3. The rear end of the guide hole 16 lies slightly forward of the center of the rotary head assembly 6. On the other hand, the rear end of the guide hole 17 lies slightly rearward of the center of the rotary head assembly 6. In practice, the rear ends of the guide holes 16 and 17 lie on extensions of the inclination vector $\beta$ as shown in FIG. 1.

As will be apparent from FIGS. 1 and 2, the guide hole 16 is shorter than the guide hole 17. The front ends of the guide holes 16 and 17 are so located that the distance between the front end of the guide hole 16 and the reel base 12 is shorter than that between the front end of the guide hole 17 and the reel base 13.

Loading post positioning blocks 18 and 19 are provided at the rear ends of the guide holes 16 and 17 respectively. The loading post positioning blocks 18 and 19 have integral mounting strips 21 and 21' extending from their bases. The mounting strips 21 and 21' are designed to be fixed to the mechanical chassis 2 by means of fastening screws or bolts to secure the loading post positioning blocks 18 and 19 onto the mechanical chassis 2. The loading post positioning blocks 18 and 19 are also provided with integral contact pieces 20 and 20' extending horizontally from their upper surfaces. The contact pieces 20 and 20' are directed substantially along the axes of the elongated guide holes 16 and 17 and have essentially V-shaped cut-outs 22 and 22' in their front edges. The V-shaped cut-outs 22 and 22' have substantially the same width as the guide holes 16 and 17.

The movable blocks 23 and 24 have movable bases from which tape loading posts 25 and 25' extend vertically, as best seen in FIG. 2. The tape loading posts 25 and 25' lie near the rear edges of the movable bases of the movable blocks 23 and 24 and follow the longitudinal axes of the guide holes 16 and 17. The movable blocks 23 and 24 have stepped sections, as seen in FIG. 5. Tilting posts 26 and 26' (FIGS. 1, 5) extend upward from the stepped sections of the movable blocks 23 and 24. Each of the tilting posts 26 and 26' is inclined at an angle $\alpha$ with respect to the vertical and inclined at an angle $\beta$ relative to a line parallel to the axis between the centers of the reel bases 12 and 13. Consequently, the tilting posts 26 and 26' have the same inclination as the rotary head assembly 6, as an best be seen in FIG. 5.

Guide shafts 27 and 27' are provided at the front edges of the movable bases of the movable blocks 23 and 24. The guide shaft 27 and 27' extend downward from the bottom of the movable bases and engage guide holes 16 and 17. In order to facilitate smooth movement, the diameters of the guide shafts 27 and 27' are substantially the same as the width of the guide holes 16 and 17. The guide shafts 27 and 27' thus slidingly engage the guide holes 16 and 17. Thus, the movable blocks 23 and 24 can move along the guide holes 16 and 17, carrying the tape loading posts 25 and 25' and the tilting posts 26 and 26'.

The lower ends of the guide shafts 27 and 27' are connected to movable block supports 58 and 59 of the loading drive mechanism, shown in FIG. 3. The movable block supports 58 and 59 are, in turn, supported by loading rings 29 and 30. The loading rings 29 and 30 and the movable block supports 58 and 59 constitute part of the movable block drive mechanism, which is generally referred to by the reference numeral "28". The movable block driving mechanism 28 is generally located beneath the mechanical chassis 2, as is seen from FIG. 5.

The annular loading rings 29 and 30 are supported beneath the mechanical chassis 2 by means of three support rollers 31. As shown in FIG. 5, the support rollers 31 ar essentially cylindrical and have axially-spaced larger-diameter sections thereon. Annular grooves 32 and 33 are formed in the output periphery of each of the larger diameter sections. The support rollers 31 are rotatably supported by rotary shafts 34 extending downward from the lower surface of the mechanical chassis 2 and are arranged so as to surround the drum base 9. The support rollers 31 can rotate about the rotary shafts 34.

The inner periphery of the upper loading ring 29 can engage the groove 32 of the support roller 31. On the other hand, the lower loading ring 30 cane engage the annular groove 33 in the roller 31. Therefore, the upper and lower loading rings 29 and 30 are supported beneath the mechanical chassis 2 with a space therebetween. Also, the engagement between the loading rings 29 and 30 and the corresponding grooves 32 and 33 allows rotation of the upper and lower loading rings 29 and 30 about the support rollers 31.

Figure 7:
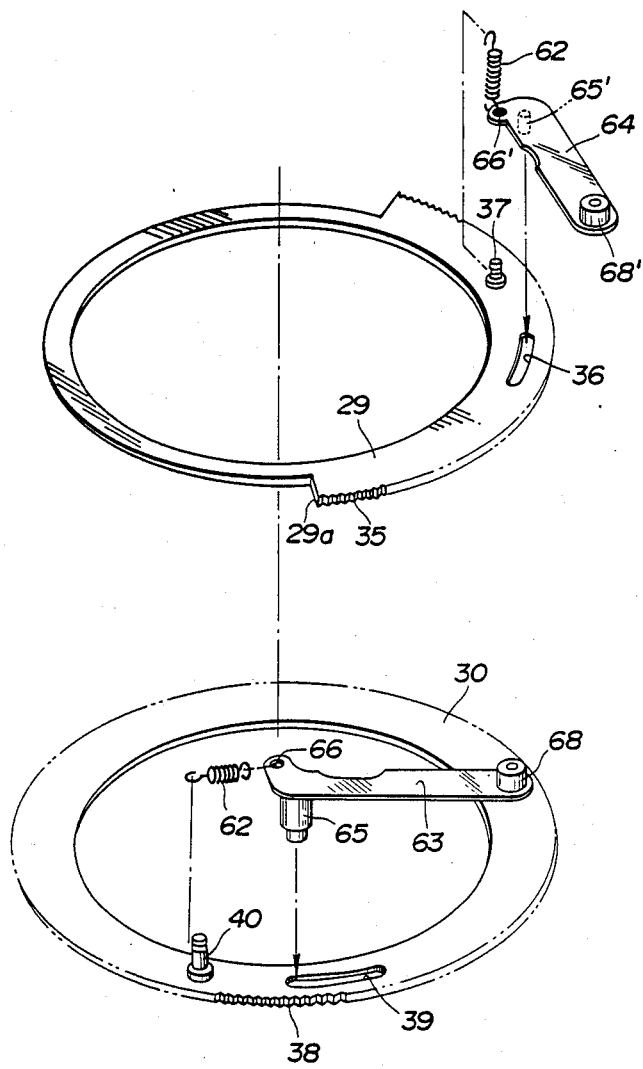
FIG. 7 is an explosed perspective view of a magnetic tape loading mechanism.
Figure 8:
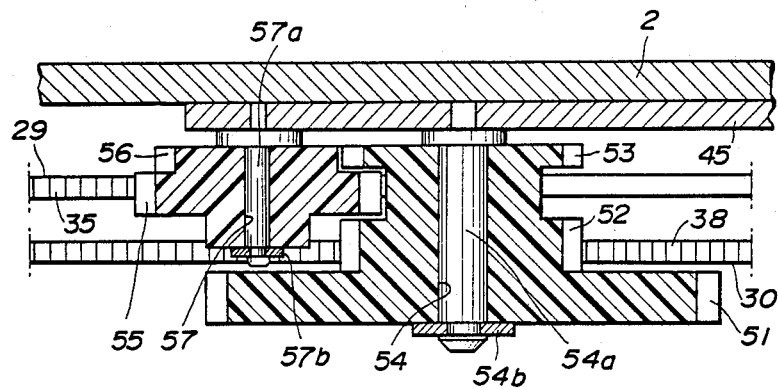
FIG. 8 is a section taken along line VIII—VIII of FIG. 1.
Figure 9:
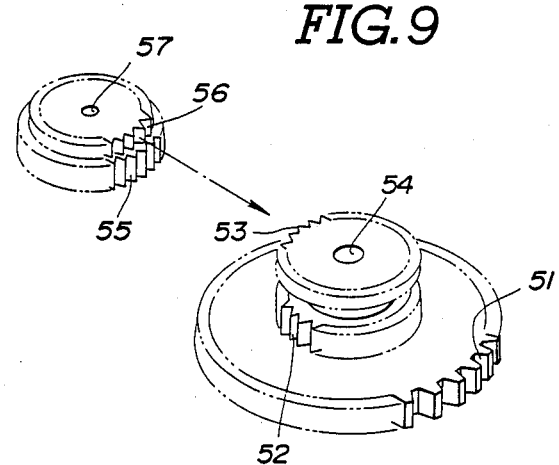
FIG. 9 is an exploded perspective view of gear blocks forming a part of drive mechanism of the recording and/or reproducing apparatus.

As shown in FIG. 7, the upper loading ring 29 has narrower and wider sections separated by an inward step 29a. The narrower section covers more than half of the circumference of the upper loading ring 29. The wider section has gear teeth 35 on its outer periphery. At about the circumferential center of the wider section, there is an arcuate elongated hole 36. The axis of the arcuate elongated hole 36 is concentric with the edges of the wider section. To one side of the elongated hole 36, a projecting pin 37 for engagement with one end of a bias spring 62' projects from the upper surface of the wider section of the upper loading ring 29.

On the other hand, the lower loading ring 30 has gear teeth all along its outer periphery. The lower loading ring 30 also has an arcuate elongated hole 38. The axis of the arcuate elongated hole 38 is concentric with the edges of the lower loading ring 30. To one side of the elongated hole 38, a projecting pin 40 projects upward from the upper surface of the lower loading ring 30. The projecting pin 40 is designed to engage one end of a bias spring 62.

The lower loading ring 30 also has a downwardly projecting pin 41 (FIGS. 1, 3). The downwardly projecting pin 41 is located on the opposite side of the arcuate elongated hole 39 from the projecting pin 40 and projects downward from the lower surface of the lower loading ring 30. The downwardly projecting pin 41 is associated with a slider 65 (shown in FIG. 4) at various mode positions depending on the mode of operation of the recording and/or reproducing apparatus.

The upper and lower loading rings 29 and 30 are associated with an electric motor 42, which serves as a loading motor, through a power train. The loading motor 42 is mounted in the right-rear corner of the mechanical chassis 2. The loading motor 42 has an output shaft 43 to which a drive pulley 44 is fixedly mounted for rotation with the output shaft 43.

A gear base 45 is mounted beneath the right-rear corner of the mechanical chassis 2. This gear base 45 rotatably supports a gear assembly serving as the power train transmitting torque from the loading motor 42 to the loading rings 29 and 30. A pair of worm gear supporting strips 46 extend upward from the upper end of the gear base 45. The worm gear supporting strips 46 are separated from each other at points opposite the front and rear ends of the loading motor 42 respectively. A worm gear 47 has a gear shaft 48 rotatably engaging the worm gear supporting strips 46. The rear end of the gear shaft 48 extends rearward past a supporting strip 46 and mounts a driven pulley 49 opposing the drive pulley 44 of the loading motor 42. The driven pulley 49 is connected to the driving pulley 44 via a cross-sectionally V-shaped endless belt 50.

A worm wheel 51 engages the worm gear 47. The worm wheel 51 is integral with a driving gear 52 which engages the gear teeth 37 of the lower loading ring so as to drive the lower loading ring 30 to rotate. The worm wheel 51 is also integral with a transmission gear 53 coaxial to the worm wheel 51 and the driving gear 52. The transmission gear 53 is located above the driving gear 52 and has a diameter approximately the same as that of the driving gear 52. The transmission gear 53 and the driving gear 52 are separated from each other. A shaft section between the transmission gear 53 and the driving gear 52 has a smaller diameter than the internal diameters of the transmission gear and the driving gear.

The worm wheel 51, the driving gear 52 and the transmission gear 53 integrally constitute a first gear block. The first gear block has an axial through opening 54 through its central axis. A support shaft 54a extends downward from the lower surface of the gear base 45. The support shaft 54a passes through the axial through opening 54 of the first gear block. The first gear block is secured axially to the support shaft 54a by means of a snap ring 54b while remaining free to rotate thereabout. At this position, the transmission gear 53 lies higher than the upper loading ring 29.

The transmission gear 53 engages a smaller diameter transmission gear 56. The smaller diameter transmission gear 56 is integral with a driving gear 55. The driving gear 55 has approximately the same diameter as the driving gear 52 of the first gear block. The driving gear 55 engages the gear teeth 35 of the upper loading ring 29. The external diameter of the smaller diameter transmission gear 56 is smaller than the internal diameter of the driving gear 55. The driving gear 55 is designed to enter a groove in the first gear block between the driving gear 52 and the transmission gear 53. The smaller diameter transmission gear 56 and the driving gear 55 integrally constitute a second gear block.

The second gear block has an axial through opening 57 through its central axis. A support shaft 57a extends downward from the lower surface of the gear base 45 and through the axial through opening 57. A snap ring 57b engages the lower end of the support shaft 57a to axially secure the second gear block on the support shaft. Thus, the second gear block is rotatably suspended from the gear base 45.

With this power train arrangement, when the loading motor 42 is driven, the worm gear 47 is driven through the output shaft 43 of the loading motor, the driving pulley 44 and the driven pulley 49 connected to the driving pulley via the endless belt 50. Rotation of the worm gear 47 causes rotation of the first gear block since the worm wheel 51 engages the worm gear 47. As a result, the lower loading ring 30, whose peripheral gear teeth 38 engage the driving gear 52, rotates.

Rotation of the first gear block is transmitted through the transmission gear 53 and the smaller diameter transmission gear 56. Because of the gear ratio, the second gear block rotates faster than the first gear block. Due to rotation of the second gear block at a higher speed than the first gear block, the upper loading ring 29, whose peripheral gear teeth 34a engage the driving gear 55 of the second gear block, is driven at a higher speed than the lower loading ring 30. At this time, since the first and second gear blocks rotate in opposite directions, the direction of rotation of the upper loading ring 29 is opposite that of the lower loading ring 30.

In practice, the loading motor 42 is driven forward during tape loading and in reverse when unloading. Given forward drive, the lower loading ring 30 is driven clockwise and the upper loading ring 29 is driven counterclockwise. This rotational sense of the upper and lower loading rings 99 and 30 will be hereafter referred to as a "loading direction". Conversely, when the loading motor 42 is driven in reverse, the lower loading ring 30 is driven counterclockwise and the upper loading ring 29 is driven clockwise. This rotational sense of the upper and lower loading rings 29 and 30 will be hereafter referred to as an "unloading direction".

Connecting levers 58 and 59 are respective interposed between the upper and lower loading rings 29 and 30 and the movable blocks 23 and 24 in order to connect the upper loading ring 29 to the movable block 24 and the lower loading ring 30 to the movable block 23. The connecting levers 58 and 59 are generally elongated strips with transverse extensions at their rear ends.

The connecting lever 58 has a downwardly projecting connector pin 60 projecting downward from its rear end. The connector pin 60 is slightly longer than the distance between the upper and lower loading rings 29 and 30 so that, although the connector lever 58 is located above the upper loading ring 29, the lower end of the connector pin reaches the lower loading ring. In practice, the lower end of the connector pin 60 slidingly engages the elongated hole 39 of the lower loading ring 30. At this condition, the bias spring 62, one end of which is secured to the projecting pin 40, engages the transverse extension of the connecting lever 60 through an opening 61. The connector lever 58 also has a boss 63 near its front end which receives the guide shaft 27 extending through the guide hole 16.

The bosses 63 and 63' allow rotation of the guide shafts 27 and 27' relative thereto. This allows the movable blocks 23 and 24 to pivot relative to the connecting levers 58 and 59. On the other hand, the connecting levers 58 and 59 are themselves pivotable about the connector pins 60 and 60' and normally biased by means of the bias springs 62, 62' such that the connector pins about the rear ends of the elongated holes 35 and 38.

Under these conditions, the connecting lever 58 moves according to rotational movement of the lower loading ring 30 along with the movable block 23 until the biasing force prevents the connecting lever from following the lower loading ring rotation. Similarly, the connecting lever 59 moves according to rotational movement of the upper loading ring 29 along with the movable block 24 until the biasing force prevents the connecting lever from following the upper loading ring rotation.

It should be noted that FIGS. 1 and 3 show the recording and/or reproducing apparatus when the magnetic tape has not yet been loaded. In this case, which will be hereafter referred to as an "unloading position", the upper and lower loading rings 29 and 30 are positioned as illustrated. In the unloading position, the movable blocks 23 and 24 are at or near the front ends of the guide holes 16 and 17. Also, in the unloading position, the connecting levers 58 and 59 are positioned as illustrated in FIGS. 1 and 3. In this case, the connector pins 60 and 60' are respectively positioned at the rear ends of the elongated holes 36 and 39.

Tape loading operations to be performed by the aforementioned loading mechanism will be described below with reference to FIGS. 1 to 3.

At the tape unloading position of FIG. 1, the loading motor 42 is driven forward. This causes rotational movement of the upper and lower loading rings 29 and 30 in their respective loading directions.

According to a rotation of the lower loading ring 30 in a loading direction, the connector lever 58 is carried to the rear and left. This causes the movable block 23 to move rearward along the guide hole 16. At the same time, the connector lever 59 is shifted to the right and rear according to rotation of the upper loading ring 29 in the loading direction. The rear-rightward movement of the connecting lever 59 causes rearward movement of the movable block 24 along the guide hole 17.

As set forth above, since the rotation speed of the upper loading ring 29 is higher than that of the lower loading ring 30, the speed of movement of the connector lever 59 and the movable block 24 are higher than that of the connector lever 58 and the movable block 23.

When the upper and lower loading rings 29 and 30 reach the positions shown in phantom lines in FIG. 3, the loading posts 25 and 25' of the movable blocks 23 and 24 come into engagement with the V-shaped cut-outs 22 and 22' of the positioning blocks 18 and 19. Thus, the movable blocks 23 and 24 are prevented from moving further rearward. At this position, tap loading is completed and then the loading motor 42 stops running. This position shown in phantom lines in FIG. 3 will be hereafter as "STOP mode position".

When another mode of operation, such as a RECORD mode, a PLAY mode and so forth, is selected at this STOP mode position, the upper and lower loading rings 29 and 30 are further rotated in their respective loading directions up to the position illustrated in FIG. 2, which shows the PLAY mode position of the recording and/or reproducing apparatus.

During this rotational movement of the upper and lower loading rings 29 and 30, the connector levers 58 and 59 are restricted from further movement with the corresponding upper and lower loading rings 29 and 30, since the front ends thereof are held against the rear ends of the guide holes 16 and 17 due to engagement between the loading posts 25 and 25' and the V-shaped cut-outs 22 and 22'. Tis causes the connector pins 60 and 60' to shift away from the rear ends of the elongated holes 36 and 39. Therefore, the distance between the projecting pins 37 and 40 and the transverse extensions at the rear ends of the connecting levers 58 and 59, and thus tension of the biasing springs 62 and 62', increase. The increased tension on the bias springs 62 and 62' biases the movable blocks 23 and 24 toward the positioning blocks 18 and 19. As a result, the loading posts 25 and 25' are firmly held within the V-shaped cut-outs 22 and 22'. Therefore, the movable blocks 23 and 24 are held securely in the STOP mode position.

To unload the magnetic tape, the loading motor 42 is driven in reverse from the position shown in FIG. 2. As the loading motor runs in reverse, the upper and lower loading rings 29 and 30 are driven in their tape unloading directions. Rotation of the upper and lower loading rings 29, 30, in their tape unloading directions causes them to return to the aforementioned tape loading-completed position illustrated in phantom line in FIG. 3. During this rotational movement of the upper and lower loading rings 29 and 30, the connecting levers 58 and 59 are still held in the positions shown in phantom line in FIG. 3. Therefore, the connector pins 60 and 60' shift to the rear ends of the elongated holes 36 and 39 as the upper and lower loading rings 29 and 30 rotate in the unloading direction. At the tape loading-completed positions of the upper and lower lading rings 29 and 30, the connector pins 60 and 60' come into contact with the rear ends of the elongated holes 36 and 39 as the projecting pins 37 and 40 and the transverse extensions of the rear ends of the connecting levers 58 and 59 gradually approach. Thus, the tension exerted on respective movable blocks 23 and 24 is gradually reduced. At the tape loading-completed position of the upper and lower loading rings, the tension on the bias springs 62 and 62' returns to its initial value.

Further rotation of the upper and lower loading rings 29 and 30 in the unloading direction ceases, the connecting levers 58 and 59 to shift forwards. Accordingly, the movable blocks 23 and 24 are shifted forward along the guide holes 16 and 17. Therefore, when the upper and lower loading rings 29 and 30 are returned to the initial position of FIG. 1, the connecting levers 58 and 59 and the movable blocks 23 and 24 are also returned t the initial position.

It should be appreciated that, as set forth above, the length of the guide holes 16 and 17 differ. Specifically, the guide hole 17 is longer than the guide hole 16. This allows the movable block 24 a greater stroke than the movable block 23. This stroke difference between the movable blocks 23 and 24 is compensated for by the differential rotation of the upper and lower loading rings 29 and 30 as set forth above. Specifically, since the rotation speed of the upper loading ring 29 is higher than that of the lower loading ring 30, the shifting stroke of the movable block 24 per unit time is greater than that of the movable block 23. Therefore, despite the required stroke difference, the movable blocks 23 and 24 can be synchronously shifted to reach their various operating positions at substantially the same time.

As shown in FIGS. 1 and 2, the loading motor is associated with a rotary encoder 64 provided adjacent thereto. The rotary encoder 64 is mounted on the mechanical chassis 2 and designed to control the loading motor operation. The rotary encoder 64 is connected to a rotation sensor (not shown) which is driven by the lower loading ring 30 to produce a rotation angle indicative signal representative of the angular movement of the lower loading ring. The rotary encoder 64 receives the rotation angle indicative signal from the rotation sensor and controls revolution of the loading motor 42.

In practice, the loading motor 42 controlled by the rotary encoder 64 actuates the upper and lower loading rings 29 and 30 among four mode positions, i.e. an unloaded position, an loading-completed position, a PPLAY mode position, and a fast-forward (F/F) mode position. At the F/F mode position, the upper and lower loading rings 29 and 30 are respectively located between the loading-completed position and the PLAY mode position.

During movement of the movable blocks 23 and 24 from the unloading position to the loading-completed position, the magnetic tape in the magnetic tape cassette inserted into the recording and/or reproducing apparatus is draw out for loading onto the rotary head 6. The mechanism and operation for tape drawing will be described later.

As shown in FIGS. 1 to 4, a slider 65 is provided beneath the mechanical chassis 2. The slider 65 has an elongated strip and extends along the left-hand edge of the mechanical chassis 2. The slider 65 has a rightward, horizontal strip 66 projecting from its rear end, and similar depression pin support tab 67 projecting rightwards from a point slightly forward of its center. The depression pin support tab 67 has a depression pin 68 projecting upward from its upper surface. The depression pin 68 is adapted to control the position of a tension regulator arm 82.

Although not clearly shown, the slider 65 also has elongated holes 69 at regular intervals along its length and a cut-out 70 at its forward end.

The rightward extending strip 66 of the slider 65 opposes the lower surface of the lower loading ring 30. At this position, slider support shafts 71 slidably engage the elongated holes 69. The slider support shafts 71 extend substantially perpendicularly to the slider 65. The slider 65 also has a downward extending strip (not shown) which anchors one end of a bias spring 72. The other end of the bias spring 72 engages the mechanical chassis 2 at a point forward of the downward extending strip. This arrangement causes the slider 65 to longitudinally shift slightly relative to the slider support shafts 71. On the other hand, the slider 65 is normally biased forward by the bias spring 72. Therefore, under normal conditions, the slider support shafts 71 but the rear edges of the elongated holes 69 and so prevent the slider from shifting further frontward, as shown in FIGS. 1 and 3. This slider position will be hereafter referred to as a "first slider position".

The mechanical chassis 2 has a cut-out 73 in its left-hand edge. The cut-out 73 opposes the depression pin 68. Therefore, the upper section of the depression pin 68 extends through the mechanical chassis 2 and projects thereabove, as shown in FIGS. 5 and 6.

During rotation of the lower loading ring 30 in the loading direction, the strip 66 of the slider 65 comes into contact with the downwardly projecting pin 41 of the lower loading ring. The downwardly projecting pin 41 depresses the strip 66 and thus the slider 65 rearward and so shifts them between different mode positions. Specifically, as the lower loading ring 30 rotates from the unloading position to the loading-completed position, the slider 65 shifts from the position shown in solid line in FIG. 4 (the first slider position) to the position shown in phantom line in FIG. 4, which shifted position will be hereafter referred to as "second slider position". Further rotation of the lower loading ring 30, moves the slider to the position shown in phantom line in FIG. 4, which position corresponds to the F/F mode position of the lower loading ring 30 and will be hereafter referred to as a "third slider position". Further rotation of the lower loading ring 30 to the PLAY mode position results in further rearward movement of the slider 65. The slider 65, at the PLAY mode position of the lower loading ring 30, lies in the position shown in FIG. 2. This slider position corresponding to the PLAY mode position of the lower loading ring 30 will be hereafter referred to as a "fourth slider position".

As it moves among the first to fourth slider positions, the slider 65 operates a tension regulator arm 82 and a brake arm 126 at respectively corresponding mode positions. Mechanism and operation of the tension regulator arm and the brake arm will be described later.

A pair of cassette positioning pins 74 and 75 on the mechanical chassis 2 position the magnetic tape cassette relative to the recording and/or reproducing apparatus. The cassette positioning pin 74 extends upward from a support strip 76 which extends horizontally from the left-hand edge of the mechanical chassis 2. The support strip 76 is vertically spaced from the upper surface of the mechanical chassis 2 near the center of the mechanical chassis. The cassette positioning pin 75 also projects upward from the mechanical chassis 2 at about the longitudinal center of the mechanical chassis 2. The longitudinal position of the cassette positioning pin 75 substantially corresponds to that of the cassette positioning pin 74.

The cassette positioning pins 74 and 75 cooperate to define the magnetic tape cassette position within the mechanical chassis.

Stationary guide posts 77, 78, 79 and 80 on the mechanical chassis 2 define a path for the magnetic tape. The first stationary guide post 77 is located near and behind the support strip 76 for the cassette positioning pin 74. The second stationary guide post 78 is positioned approximately halfway between the first stationary guide post 77 and the loading post positioning block 18. The third stationary guide post 79 is positioned approximately halfway between the loading post positioning block 19 and the cassette positioning pin 75. The fourth stationary guide post 80 is located near the cassette positioning pin 75 but offset therefrom to the rear and right. The arrangement of the stationary guide posts 77, 78, 79 and 80 is shown in FIGS. 1 and 2.

A capstan 81 is provided near the stationary guide post 79 but offset from the latter to the right and forward. As is well known, the lower end of the capstan 81 is firmly connected to a flywheel (not shown) beneath the mechanical chassis 2. The upper section of the capstan 81 extends through a through opening in the mechanical chassis 2. The capstan 81 is driven by a capstan motor (not shown) at a constant speed while the recording and/or reproducing apparatus is operating in a RECORD or a PLAY mode.

A tension regulator arm 82 is pivotably supported on the mechanical chassis by means of a pivot pin 83. The pivot pin 83 projects upward from the mechanical chassis 2 near the left-hand edge thereof. The pivot pin 883 is connected to the front end of the tension regulator arm 82 and supports the latter pivotably. The tension regulator arm 82 has a bent front end section which is bent like a hook. A tension regulator pin 84 extends from the front end of the tension regulator arm 82. The tension regulator arm 82 has a frontward extending extension strip 85. The extension strip 85 has a through opening which anchors one end of a tension spring 87. The other end of the tension spring 87 engages a pin 86 projecting upward from the mechanical chassis 2. The pin 86 is located forward and to the right of the pivot pin 83. The tension spring 87 exerts a constant counterclockwise biasing force on the tension regulator arm 82.

The tension regulator arm 82 is positioned as shown in FIG. 1 while the recording and/or reproducing apparatus is in an unloading mode. This position of the tension regulator arm 82 will be hereafter referred to as an "unloading position". The tension regulator arm 82 is actuated to this unloading position by means of a known control means (not shown). At this unloading position, the tension regulator pin 84 is sandwiched between the movable blocks 23 and 24.

The left-hand edge 88 of the tension regulator arm 82 opposes the tension regulator control pin 68 of the slider 65. On the left-hand edge 88 of the tension regulator arm 82, a cam surface 88a and a deep cut-out are formed. The cam surface 88a and the cut-out 88b cooperate with the tension regulator arm control pin 68 to control the angular position of the tension regulator arm 82 and thereby control the position of the tension regulator pin 84 relative to a magnetic tape path defined by the stationary guide posts 77 and 78. At the unloading position of FIG. 1, the cam surface 88a and the cut-out 88b are both separated from the tension regulator arm control pin 68. During the aforementioned loading operation involving rotation of the upper and lower loading rings 29 and 30 and rearward movement of the movable blocks 16 and 17, the tension regulator arm 82 becomes free to move. As a result, the tension regulator arm 82 and the tension regulator pin rotate counterclockwise due to a biasing force of the tension spring 87. This pivotal movement brings the cam surface 88a or the cut-out 88b into contact with the tension regulator arm control pin 68 according to the slider position in tee current operating mode. tension regulator band 89 is wrapped around the reel base 12. One end of the tension regulator band 89 is connected to a connector member 90 pivotally connected to the tension regulator arm 82. The other end of the tension regulator band 89 is connected to a tension adjusting block 91.

An essentially L-shaped pinch roller arm 92 is pivotally connected to the mechanical chassis 2 near its right-hand edge by means of a pivot shaft 93. The pivot shaft 93 lies near the right-hand edge of the mechanical chassis 2 and is offset to the right and forward of the cassette positioning pin 75. A roller shaft 94 extends from the free end of the pinch roller arm 92. The roller shaft 94 extends through the pinch roller arm 92 and projects upward and downward from the upper and lower surfaces of the pinch roller arm. A pinch roller 95 rotatably engages the upper section of the roller shaft 94 extending upward from the pinch roller arm 92.

The lower section of the roller shaft 94 extending downward from the pinch roller arm 92 extends through an arcuate elongated guide opening 96 in the mechanical chassis 2. The curve of the elongated guide opening 96 is centered over the axis of the pivot shaft 93.

The pinch roller arm 92 also has a projection pin 97 projecting from its upper surface. The projection pin 97 is located near the bend in the L-shaped pinch roller arm 92 and is offset toward the pivot end from the bend.

The projection pin 97 engages one end 104a of a torsion spring 104.

A movable post support arm 98 is provided beneath the mechanical chassis 2. The movable post support arm 98 is pivotable about an arm shaft 99 extending downward from the mechanical chassis. The arm shaft 99 is located near but slightly behind the pivot shaft 93 of the pinch roller arm 92. The movable post support arm 98 is essentially a straight elongated strip with a movable post 100 projecting from its free end. The movable post 100 extends upward through an arcuate guide opening 101 in the mechanical chassis 2. The curvature of the guide opening 101 is centered at the axis of the movable post support arm shaft 99.

The movable post 100 extends upward from the mechanical chassis through the arcuate guide opening 101.

The movable post support arm 98 also has an upward projecting pin 102 near its center. The upward projecting pin 102 extends through an arcuate opening 103 in the mechanical chassis 2. The arcuate opening 103 is concentric with the arcuate guide opening 101, but is of smaller radius of curvature. The upward projecting pin 102 extends through the arcuate opening 103 and engages the other end 104b of the torsion spring 104.

The torsion spring 104 is wound around the lower smaller-diameter section of the cassette positioning pin 75. As shown in FIGS. 1 and 2, the one end 104a of the torsion spring 104 engages the projection pin 97 of the pinch roller arm 92 from the left and the other end 104b engages the upward projecting pin 102 of the movable post support arm 98 from the right. The torsion spring 104 constantly exerts a biasing force on both the pinch roller arm 92 and the movable post support arm 98 via its ends 104a and 104b and the projecting pins 97 and 102 so as to hold them at the positions shown in FIG. 1.

A movable post positioning block 105 lies near the rear end of the arcuate opening 101. The movable post positioning block 105 has a front end section with an essentially V-shaped cut-out 106. The movable post positioning block 105 is secured to the mechanical chassis 2 with the V-shaped cut-out 106 facing the length of the arcuate opening 103.

With such arrangement, the pinch roller arm 92 and the pinch roller 95, and the movable post support arm 98 and the movable post 100 are positioned as shown in FIG. 1 while the recording and/or reproducing apparatus is in an unloading mode. The torsion spring 104 constantly biases the pinch roller arm 92 toward this unloading position by exerting the torsional spring force through the projection pin 97, which torsional force also serves to pivot the pinch roller arm counterclockwise. Likewise, the torsion spring 104 constantly biases the movable post support arm 98 toward the unloading position by exerting a torsional force on the upward projecting pin 102, which torsional force serves to bias the movable post support arm counterclockwise. As will be appreciated from FIG. 1, at the unloading mode positions of the recording and/or reproducing apparatus, the roller shaft 94 of the pinch roller 95 and the movable post 100 are in contact with front ends of the arc-shaped guide openings 96 and 101 respectively.

During tape loading, the pinch roller arm 92 and the movable post support arm 98 are actuated to the loading position, at which the roller shaft 94 of the pinch roller 95 abuts the rear end of the arcuate guide opening 96 while the pinch roller 95 abuts the capstan 81 via the magnetic tape 135 so as to pinch the magnetic tape against the capstan to ensure that the tape is driven by rotation of the capstan, and the movable post 100 comes into engagement with the V-shaped cut-out 106 of the movable post positioning block 105 by a known actuation means. In practice, this actuation means comprises an arm depression means associated with the upper loading ring 29 for movement according to rotation of the upper loading ring 29.

A pair of brake arms 107 and 108 are provided beneath the mechanical chassis 2. The brake arms 107 and 108 are designed to exert an appropriate braking force on the corresponding reel bases 12 and 13 according to the mode of operation of the recording and reproducing apparatus. Specifically, the brake arm 107 corresponds to the reel base 12 associated with the supply reel of the magnetic tape cassette. On the other hand, the brake arm 108 corresponds to the reel base 13 associated with the receiving reel of the magnetic tape cassette.

The brake arm 107 is pivotably secured on the sub-chassis 4 by means of a pivot pin 109. The pivot pin 109 for the brake arm 107 projects from a point on the sub-chassis 4 offset frontward and to the left of the reel base 12. The brake arm 107 has a face opposing the reel base 12 at its free end. A brake shoe 110 is mounted on the face of the brake arm 107. The brake arm 107 also has an extension strip 111. The extension strip 111 extends from the face of the brake arm 107 opposing the reel base 12. On the edge remote from the reel base 12, the brake arm 107 has an extension 107a with an elongated hole 112. The longitudinal axis of the elongated hole 112 lies essentially parallel to the longitudinal axis of the mechanical chassis 2.

The brake arm 107 is normally biased toward the reel base 12 to engage the brake shoe 110 to the periphery of the reel base by means of a bias spring 114. The bias spring 114 has one end engaged to the extension strip 111 of the brake arm and the other end connected to a pin 113 extending from the sub-chassis 4. The pin 113 is located on the sub-chassis 4 at a point offset to the left and rear of the pivot pin 109. The spring force of the bias spring 114 exerted on the brake arm 107 biases the latter counterclockwise and serves to provide a predetermined braking force limiting or preventing rotation of the reel base as long as the brake shoe remains in contact with the periphery of the reel base 12.

The brake arm 108 is generally L-shaped. The brake arm 108 is pivotably mounted on the sub-chassis 4 by means of a pivot pin 115 at its apex. The pivot pin 115 is offset to the left and forward of the reel base 13. The brake arm 108 has a face opposing the outer periphery of the reel base 13 at its free end, on which a brake shoe 116 is mounted. On the same face, the brake arm 108 has an extension strip 117. The extension strip 117 receives one end of a biasing spring 119. The other end of the biasing spring 119 is connected to a pin 118 projected from the sub-chassis 4. The pin 118 is offset to the right and forward of the reel base 13. Therefore, the biasing spring 119 normally biases the brake arm 108 clockwise to urge the brake shoe 116 against the outer periphery of the reel base 13. As long as the brake shoe 116 remains in contact with the outer periphery of the reel base 13, the spring force of the biasing spring 119 serves to prevent or limit free rotation of the reel base.

The brake arm 108 has another free end section 108a remote from the end on which the brake shoe 116 is mounted, which end opposes the front end of the extension 107a of the brake arm 107.

A brake lock arm 120 opposes the brake arm 108. The brake lock arm 120 is generally L-shaped. The brake lock arm 120 is pivotably mounted on the sub-chassis 4 by means of a pivot pin 121 extending from the sub-chassis 4 at its apex. The pivot pin 121 is located near but slightly forward and to the right of the pivot pin 115 of the brake arm 108. The brake lock arm 120 has an essentially transverse section and an essentially longitudinal section forming the L-shaped configuration. The longitudinal section is connected to the transverse section at its front end, i.e. at the apex. The rear end of the longitudinal section is formed into a hook 122 which receives one end of a biasing spring 125. The other end of the biasing spring 125 engages a pin 124 extending vertically from the sub-chassis 4. The pin 124 is transversely in alignment with the pin 118 for the biasing spring 119 and lies forward of the pin 119. Therefore, the biasing spring 125 constantly biases the brake lock arm 120 clockwise as viewed in FIGS. 1 to 3.

The brake lock arm 120 also has an actuation pin 123 which extends vertically from the front edge of of the transverse section. The actuation pin 123 normally contacts the front edge of the brake arm 108 with a predetermined biasing force provided by the biasing spring 125. The biasing force of the biasing spring 125 exerted on the brake arm 108 through the actuation pin 123 cooperates with the biasing force directly provided by the biasing spring 119 to firmly urge the brake shoe 116 of the brake arm 108 against the outer periphery of the reel base 113, as shown in FIG. 1. As a result, the reel base 113 is prevented from rotating.

The free end 120a of the transverse section of the brake lock arm 120 extends beneath the brake arm 107 and opposes the center of the elongated hole 112.

The positions of the brake arms 107 and 108 and the brake lock arm 120 are controlled by the brake control arm 126 extending nearly left-to-right from the front-left center of the mechanical chassis 2. The brake control arm 126 pivots about a pivot 129 mounted on a bracket 128. The bracket 128 is fixed to the lower surface of the mechanical chassis 2 near the pivot 109 for the brake arm 107.

The left-hand end of the brake control arm 126 engages the cut-out 70 formed in the upper front edge of the slider 65. The brake control arm 126 has a control pin 127 at its right-hand end. The control pin 127 extends downwardly from the lower surface of the right end of the brake control arm 126 and projects downward through the elongated hole 112 in the brake arm 107. Beneath the brake arm 107, the control pin 127 is in contact with the left end 120a of the brake lock arm 120.

In the unloading mode, the brake arms 107 and 108, the brake lock arm 120 and the brake control arm 126 are all positioned as shown in FIG. 1. At this position, braking forces are applied to both of the reel bases 12 and 13 to limit rotation of the reel base 12 and prevent the reel base 13 from rotating altogether. These respective positions of the brake arms 107 and 108 and the brake lock arm 120 will be referred to hereafter as a "brake application position". As set forth above, as the recording and/or reproducing apparatus moves from the unloading mode to the loading-completed mode, the slider 65 shifts rearward due to rotation of the lower loading ring 30. Rearward movement of the slider 65 causes the brake control arm 126 to pivot clockwise about the pivot 129. As a result, the control pin 127 at the right end of the brake control arm 126 shifts forward to cause counterclockwise pivotal movement of the brake lock arm 120 about the pivot pin 121 against the biasing force of the biasing spring 125. Accordingly, the actuation pin 123 is released from the front edge of the brake arm 108. Subsequently, the control pin 127 comes into contact with the front edge of the elongated hole 112. Further rearward movement of the slider 65 biases the brake control arm 126 through the control pin 127 so as to cause clockwise rotation about the pivot 109. As a result, the brake shoe 110 of the brake arm 107 is released from braking engagement with the outer periphery of the reel base 12.

The front end of the extension 107a of the brake arm 107 mates with the rear edge of the left end 108a of the brake arm 108. Therefore, clockwise rotation of the brake arm 107 drives the left end 108a of the brake arm 108 frontward, causing the brake arm 108 to rotate counterclockwise about the pivot 115. This releases the brake shoe 116 of the brake arm 108 from braking engagement with the reel base 13.

The positions of the brake arms 107 and 108, the brake lock arm 120 and the brake control arm 126 resulting from this rearward movement of the slider 65 will be hereafter referred to as a "brake releasing position".

It should be appreciated that the timings of actuation of the brake arms 107 and 108 and the brake lock arm 120 from the brake application position to the brake releasing position are delicately adjusted in a per se known manner. The timings and the timing adjustment to be performed in the foregoing braking mechanism will be described later.

In FIGS. 1 and 2, a magnetic tape cassette 130 is shown fragmentally for the sake of disclosure. The magnetic tape cassette 130 has a conventional, thin box-like cassette casing 131. The cassette casing 131 has a recess 132 opposing the head assembly 6. The recess 132 of the cassette casing 131 opens at the sides opposing the head assembly 6 and has a downward opening through which the loading posts 25 and 25' of the movable blocks 23 and 24 can enter to draw out some of the magnetic tape 135 for loading as the system moves from the unloading mode position to the loading-completed position.

Although not clearly shown in the drawing, the cutouts in the sidewall forming the recess 132 can be covered by a pivotal lid and the downward-facing opening can be covered by a sliding closure. The pivotal lid and the sliding closure cover respectively the cut-outs and the opening while the magnetic tape cassette is not in use. The pivotal lid and the sliding closure are actuated to expose respectively the cut-out and the opening when the magnetic tape cassette 130 is inserted into a cassette holder (not shown) of the recording and/or reproducing apparatus and moved to a known set position in the recording and/or reproducing apparatus.

In the drawings, the reference numerals 133 and 133' denote openings in the cassette casing 131 through which the magnetic tape 135 can be drawn out for loading. Tape guide posts 134 and 134' are provided in the cassette casing 131 near the respective openings 133 and 133'.

A pair of tape reels (not shown), i.e. the supply reel and the receiving reel, are rotatably disposed within the cassette casing 131. Each of the tape reels engages the corresponding reel shaft 15 or 15' projecting from the corresponding reel base 12 or 13. The magnetic tape 135 is wound around the tape reels. The magnetic tape 135 runs through a tape path within the cassette casing 131 as illustrated in thick two-dotted lines in FIG. 1, before loading. Specifically, the magnetic tape 135 on the supply reel passes out of the cassette casing 131 through the opening 133 and crosses the front edge of the recess 132 between the guide posts 134 and 134'. The magnetic tape 5 then enters the cassette casing 131 through the opening 133' and is wound onto the receiving reel.

When the magnetic tape cassette 130 is loaded into the recording and/or reproducing apparatus, the cassette rests on the mechanical chassis 2 as shown in FIG. 1. The positioning pins 74 and 75 engage respectively corresponding positioning holes (not shown) in the cassette casing and thus hold the magnetic tape cassette 130 at the predetermined set position.

The operation of the aforementioned preferred embodiment of the recording and/or reproducing apparatus for a magnetic tape cassette will be described herebelow.

The magnetic tape cassette 130 is loaded onto the mechanical chassis 2 at the position of FIG. 1 when the recording and/or reproducing apparatus is still in the unloading mode. As will be appreciated from FIG. 1, when the magnetic tape cassette 130 is in the position shown in FIG. 1, the tape loading posts 25 and 25, the tilting posts 26 and 26', the tension regulator pin 84, the pinch roller 95 and the movable guide post 100 are all positioned within the recess 132 and against the backside of the magnetic tape 135. Specifically, the portion of the magnetic tape 135 between the guide posts 134 and 134' rests against the rear sides of the aforementioned tape loading posts 25 and 25, the tilting posts 26 and 26', the tension regulator pin 84, the pinch roller 95 and the movable guide post 100.

Under these conditions, the loading motor 42 starts running in the forward direction in response to a command for loading. The force of the loading motor 42 transmitted through the gear blocks 51 and 56 drives the upper and lower loading rings 29 and 30 to rotate in their respective loading directions. Accordingly, the movable blocks 23 and 24 are driven from the unloading mode positions to the loading-completed positions along the respectively corresponding elongated holes 16 and 17. During this movement of the movable blocks 23 and 24, the loading posts 25 and 25' come into contact with the backside of the magnetic tape 135 and draw the magnetic tape out of the cassette casing 131.

On the other hand, as the magnetic tape 135 is withdrawn by the movement of the loading posts 25 and 25' of the movable blocks 23 and 24, the brake shoe 110 of the brake arm 107 is held in contact with the outer periphery of the reel base 12 so as to exert braking force resisting the torque applied to the reel base 12 due to withdrawal of the magnetic tape. The braking force exerted on the reel base 12 through the brake shoe 110 is so adjusted as to allow rotation of the reel base 12 due to the force of withdrawal but to prevent the reel base 12 from rotating due to inertia. This braking force, which does not completely prevent the reel base from rotating but does not allow free rotation of the reel base, will be hereafter referred to as a "soft brake".

On the other hand, during loading, the biasing forces of the biasing springs 119 and 125 are cooperatively applied to the brake arm 108 to firmly urge the brake shoe 116 against the outer periphery of the reel base 13. This completely prevents the reel base 13 from rotating. This braking force completely preventing the reel base from rotating will be hereafter referred to as a "lock brake".

By applying a soft brake to the reel base 12 corresponding to the supply reel of the magnetic tape cassette 130 and a lock brake to the reel base 13 corresponding to the receiving reel, the magnetic tape 135 is withdrawn only from the supply reel. At this time, by restricting rotation for the reel base 12 by means of the soft brake, the magnetic tape 135 drawn across the loading posts 25 and 25' will be at a sufficient tension. Also, the soft brake on the reel base 12 prevents backrush by which an extra length of magnetic tape may abruptly spin off the supply reel.

During loading, the tension regulator arm 82, the brake lock arm 120, the movable guide post 100 and the pinch roller 95 all shift to their respective loading-completed positions.

Figure 4:
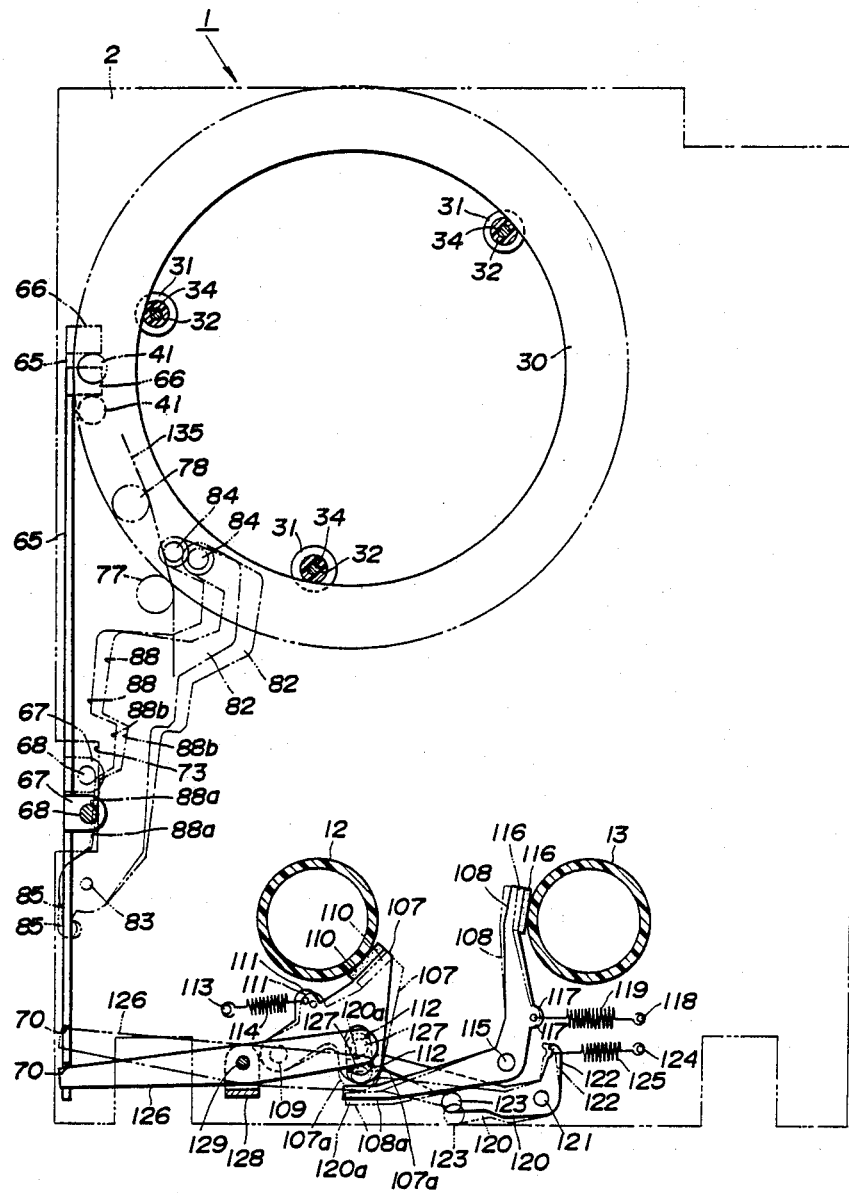
FIG. 4 is a plan view showing components of the recording and/or reproducing apparatus lying further below the components illustrated in FIG. 3.

Specifically, after the loading rings 29 and 30 have rotated far enough to move the movable blocks 23 and 24 to their loading-completed positions, the actuation pin 41 comes into contact with the transverse strip 66 of the slider 65, as shown in FIG. 4. Thus, the slider 65 is urged rearward from the first slider position to the second slider position.

During this slider movement from the first slider position to the second slider position, the tension regulator arm 82, which initially is locked in the position of FIG. 1 by means of a stopper mechanism (not shown) of the recording and/or reproducing apparatus, is released from the stopper mechanism. Therefore, the tension regulator arm 82 pivots counterclockwise about the pivot pin 83 due to the biasing force of the bias spring 87. This counterclockwise rotation brings the cam surface 88a of the tension regulator arm 82 into contact with the tension regulator arm control pin 68 of the slider 65. This prevents the tension regulator arm 82 from rotating further counterclockwise. The position of the tension regulator arm 82 as the slider shifts from the first slider position to the second slider position of the slider 65 is illustrated by the two-dotted line in FIG. 4. As shown in FIG. 4, when the slider 65 reaches the second slider position shown by the two-dotted line, the rear edge of the cam surface 88a engages the tension regulator arm control pin 68. The position of the tension regulator arm 82 when the slider 65 is shifted into the second slider position is illustrated by a one-dotted line in FIG. 4. At the tension regulator arm 82 position illustrated by the two-dotted line, the tension regulator pin 84 is held away from the backside of the magnetic tape 135. When the loading rings 29 and 30 reach their loading-completed positions and thus the slider 65 is shifted to the second slider position, the tension regulator pin 84 of the tension regulator arm 82 approaches to a path of the magnetic tape and is positioned slightly away from the backside of the magnetic tape as shown by the one-dotted line in FIG. 4.

During the aforementioned movement of the slider 65 from the first slider position to the second slider position, the left end of the brake control arm 126 engaging the cut-out 70 of the slider shifts rearward. This causes the brake control arm 126 to pivot clockwise about the pivot 129. The clockwise pivotal movement of the brake control arm 126 shifts the control pin 127 at the right end of the brake control arm 126 frontward, causing counterclockwise pivotal movement of the brake lock arm 120 about the pivot 121 against the biasing force of the biasing spring 125. Accordingly, the actuation pin 123 is released from the front face of the brake arm 108. Subsequently, the control pin 127 comes into contact with the front edge of the elongated hole 112. Further rearward movement of the slider 65 causes the brake control arm 126 to bias the brake lock arm 120 to release the pin 123 from engagement with the forward face of the brake arm 108. This reduces the braking force applied to the reel base 13 through the brake shoe 116. In other words, the soft brake is applied to the reel base 13 by the biasing spring 119 by way of brake arm 108.

At this position, the control pin 127 is intermediate the front and rear edges of the elongated hole 112. Therefore, no clockwise pivotal force will be exerted on the brake arm 107. Therefore, the brake shoe 110 of the brake arm 107 remains in engagement with the outer periphery of the reel base 12. Thus, the soft brake is applied to the reel base 12 by the bias spring 114 via the brake arm 107. Thus, the brake arm 107 does not pivot, but rather continues to apply the soft brake on the reel base 12.

At the same time, the pinch roller arm 92 carrying the pinch roller 95 and the guide post support arm 98 carrying the guide post 100 are actuated by a known actuation means to pivot clockwise. In practice, the actuation means for the pinch roller arm 92 and the guide post support arm 98 is mounted beneath the mechanical chassis 2 and acts on the lower ends of the pinch roller shaft 94 and the guide post 100 extending down through the mechanical chassis 2.

The pinch roller arm 92 is pivotally shifted to a position in which the pinch roller 95 is separated from the capstan 81 and thus does not pinch the magnetic tape 135 against the capstan. On the other hand, the guide post 100 is moved to the guide post positioning block 105 and engages the cut-out 106.

When the loading rings 29 and 30 are rotated to their respective loading-completed positions as set forth above, the loading motor 42 stops. As part of the loading operation, the magnetic tape 135 is extracted from the magnetic tape cassette 130 and threaded through the same path illustrated in thick two-dotted lines in FIG. 2. However, at this loading-completed position, the tension regulator pin 84 is separated slightly from the backside of the magnetic tape and thus is not yet aligned with the guide posts 77 and 78 and thus does not exert any tension on the magnetic tape. Also, at this loading-completed position, the pinch roller 95 is separated from the capstan 81 and thus does not pinch the magnetic tape 135.

When a command ordering the fast-forward (F/F) mode or the REWIND mode is received in the loading-completed position as set forth above, the loading motor 42 is driven forward. This causes the loading rings 29 and 30 to be driven in the loading direction beyond the loading-completed position until they reach the fast-feed position which is intermediate the loading-completed mode position and the PLAY mode position.

As a result, the actuation pin 41 of the lower loading ring depresses the strip 66 of the slider 65 rearward. The slider 65 is thus shifted from the second slider position to the third slider position, as shown by the two-dotted line in FIG. 4. At this third slider position, the tension regulator control pin 68 of the slider 65 maintains contact with the cam surface 88a of the tension regulator arm 82. Even though the tension regulator arm 82 pivots slightly counterclockwise from the position corresponding to the loading-completed position of the loading rings 29 and 30, the tension regulator pin 84 is kept slightly away from the magnetic tape 135 or is in contact so lightly that it exerts no tension on the magnetic tape.

During the movement of the slider 65 from the second slider position to the third slider position, the left end of the brake control arm 126 shifts further rearward causing the control pin 127 to abut the front edge of the elongated hole 112 of the brake arm 107. The brake arm 107 is thus pivoted clockwise about the pivot 109. This releases the brake shoe 110 from the outer periphery of the reel base 12 and so allows the reel base 12 free rotation. Clockwise pivotal movement of the brake arm 107 moves the brake arm 108 forward with its rear edge mating the front face of the strip section 107a of the brake arm 107. This causes counterclockwise pivotal movement of the brake arm 108 so that the brake shoe 116 separates from the outer periphery of the reel base 13. Therefore, the reel base 13 also becomes free to rotate In other words, behaviour of the brake control arm 126 during the shifting o the slider 65 from the second slider position to the third slider position releases the soft brake on the reel bases 12 and 13.

Under these conditions, one of the reel bases 12 and 13 will be driven by the tape drive mechanism forward or backward for a F/F mode or a REWIND mode operation, respectively.

When a command ordering a PLAY mode or a RECORD mode operation is given at the loading-completed mode position or the fast-feed mode position, the loading motor 42 is again driven to rotate the loading rings 29 and 30 to the PLAY mode position. As the loading rings 29 and 30 reach the PLAY mode position, the movable blocks 23 and 24 reach their rear end positions. At this position, the loading posts 25 and 25' engage the V-shaped cut-outs 22 and 22' of the positioning blocks 18 and 19 with a predetermined depression force. As set forth previously, at this position, the loading posts 25 and 25' firmly engage the cut-outs 22 and 22' to hold the movable blocks 23 and 24 in their PLAY mode positions.

As the loading rings 29 and 30 move to their PLAY mode positions, the actuation pin 41 of the lower loading ring 30 also depresses the strip 66 of the slider 65 rearward so as to shift the slider 65 to the fourth slider position shown in FIG. 2. As a result, the tension regulator arm control pin 68 of the slider 65 enters the cut-out 88b of the tension regulator arm 82. This allows further clockwise pivotal movement of the tension regulator arm 82, which shifts the tension regulator pin 84 into alignment with the guide pins 77 and 78. This exerts sufficient tension on the magnetic tape 135 to hold it steadily in the path around the head assembly 6.

As will be seen from FIG. 2, the guide posts 77 and 78 oppose the frontside of the magnetic tape 135 and are designed to contact the frontside surface of the magnetic tape. On the other hand, the tension regulator pin 84 is designed for contact with the backside of the magnetic tape 135. Therefore, the tension regulator pin 84 is essentially in alignment with the guide posts 77 and 78 defines a bent path for the magnetic tape. This bent path serves to ensure adequate traction at the given tape tension. The tension on the magnetic tape 135 can be adjusted by adjusting the force of the bias spring 87. At the same time, the actuator pin 68 is placed within the cut-out 88b but away from the peripheral edge of the cut-out. The position of the actuation pin 68 relative to the cut-out 88b is determined by the balance between the tension on the magnetic tape 135 and the biasing force of the spring 87. As a result, the tension on the magnetic tape 135 will be substantially constant corresponding to the tension on the biasing spring 87.

During rotation of the loading rings 29 and 30 to the PLAY mode positions, the pinch roller arm 92 pivots clockwise to contact the capstan 81 via the magnetic tape 81. The contact between the capstan 81 and the pinch roller 95 is firm enough to allow transmission of the rotational force of the capstan to the magnetic tape.

It should be appreciated that, as is well known, the pinch roller arm actuation means (not shown) includes an elastic or resilient member serving as a stopper for the pinch roller arm 92 resiliently restricting pivotal movement of the pinch roller arm and providing sufficient resilient force to press the pinch roller 95 against the capstan with a given pressure. The resilient force of the elastic or resilient member also serves to press the movable guide post 100 into the cut-out 106 of the movable guide post positioning block 105.

Rearward movement of the slider to the fourth slider position pivots the brake control arm 126 further about the pivot 129 to cause further pivotal movement of the brake arms 107 and 108 clockwise and counterclockwise respectively. Therefore, the brake shoes 110 and 116 are shifted further away from the outer periphery of the reel bases 12 and 13 respectively.

The foregoing operations actuate the recording and/or reproducing apparatus to the PLAY mode position. In the PLAY mode position of FIG. 2, the magnetic tape 135 passes through the opening 133, the guide pin 77, the tension regulator pin 84, the guide 87, the loading post 25, the tilt post 26, the head assembly 6, the tilt post 26', the loading post 25', a magnetic head 136 for recording control signals and so forth, the guide pin 79, the capstan 81, the guide post 100, the guide pin 80 and the opening 133'. The magnetic tape 135 is wrapped around the front surface of the head assembly 6 in this position. The path of the magnetic tape 135 set forth above will be referred to hereafter as "tape path".

In this position, the capstan 81 is driven at a constant speed to drive the magnetic tape 135 through the aforementioned tape path at a substantially constant speed. At the same time, the upper rotary drum 8 rotates as the magnetic head 10 records data or reproduces prerecorded data. At this time, back-tension on the magnetic tape 135 is held substantially constant by the tension regulator pin 84.

It should be appreciated that the tension on the tension regulator belt 89 varies according to pivotal movement of the tension regulator arm 82 and thus according to the tension on the magnetic tape 135. Thus, the tension on the tension regulator belt 89 is controlled by the tension regulator arm 82. The controlled tension provided by the tension regulator belt 89 holds resistance to rotation of the reel base 12 essentially constant. As a result, the rate of unwinding of magnetic tape from the supply reel of the magnetic tape cassette 130 can be satisfactorily and successfully adjusted and thus the tension of the magnetic tape can be controlled.

It should be appreciated that when a command ordering the magnetic tape to stop is received during a fast-feed mode operation or PLAY or RECORD mode operation, the driving force on the reel base or the capstan is instantly terminated. At the same time, the loading motor 42 is driven in reverse to return the loading rings 29 and 30 to the loading-completed position. According to this rotation of the loading rings 29 and 30 in the unloading direction, the various components of the recording and/or reproducing apparatus are returned to positions corresponding to the loading-completed position of the loading rings.

When a command ordering unloading of the magnetic tape is received (EJECT is ordered), the loading motor 42 is driven in reverse. Accordingly, the loading rings 29 and 30 are driven in their unloading directions. This causes the movable blocks 23 and 24 and the loading posts 25 and 25' to move forward along the elongated holes 16 and 17 back to their respective unloading positions.

At the same time, a tension regulator arm returning means (not shown) becomes active to pivotally move the tension regulator arm 82 clockwise about the pivot pin 83 back to the position of FIG. 1. The tension regulator arm 82 is locked at the position of FIG. 1 by means of a stopper means (not shown).

Rotation of the lower loading ring 30 in an unloading direction moves the actuation pin 41 away from the strip 66 of the slider 65. As a result, the slider 65 returns to the first slider position due to the spring force of the spring 72. According to the frontward movement of the slider 65, the brake control arm 126 pivots counterclockwise about the pivot 129. When the slider 65 reaches the position of FIG. 1, the brake control arm 126 is also positioned at the position of FIG. 1. Therefore, the brake arms 107 and 108 and the brake lock arm 120 are returned to the positions of FIG. 1 by the biasing forces of respectively corresponding biasing springs 114, 119 and 125. As a result, the soft brake is applied to the reel base 12 and the lock brake is applied to the reel base 13.

It should be noted that as the loading rings 29 and 30 are driven in their unloading directions, the reel base 12 is driven in the winding direction to take up the extracted magnetic tape in a per se well-known manner.

During this unloading operation, the arm actuation member (not shown) associated with the pinch roller arm 92 and the movable post support arm 98 shifts away from the pinch roller arm and the movable post support arm. Therefore, the pinch roller arm 92 and the movable post support arm 98 are returned to the positions of FIG. 1 by means of the torsion spring 104.

After the aforementioned unloading operation, the cassette holder (not shown) of the recording and/or reproducing apparatus is moved to the eject position to ejecting the magnetic tape cassette.

FIGS. 10 to 16 show various modifications to the power train which transmits the driving force of the loading motor 42 to the upper and lower loading rings 29 and 30.

Figure 10:
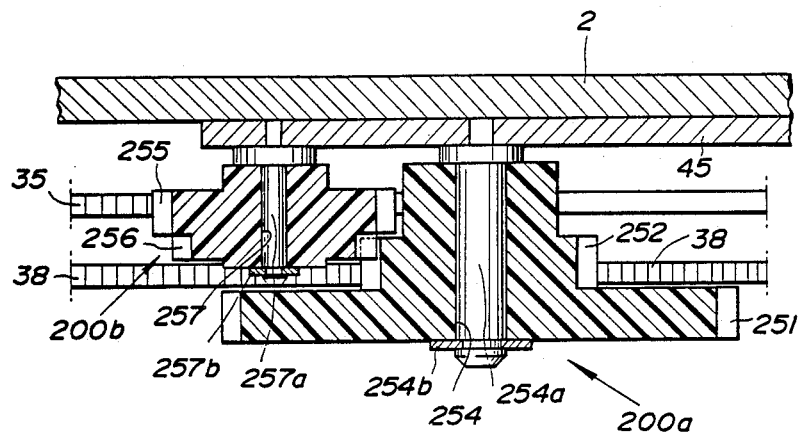
FIG. 10 is a section similar to FIG. 8, but showing a modification of a gear block assembly in the preferred embodiment of FIG. 8.
Figure 11:
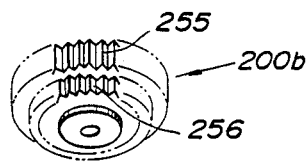
FIGS. 11 and 12 are bottom and top perspective views respectively of the gear blocks of FIG. 10.
Figure 12:
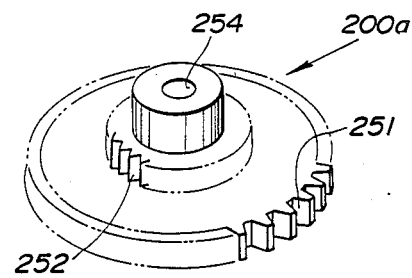

FIGS. 10 to 12 shows the first modification of the power train which comprises first and second gear blocks 200a and 200b. In this first modification of the power train, only the first and second gear blocks 200a and 200b are the only elements of the power train differing from those in the preferred embodiment.

As in the preferred embodiment, the gear base 45 is mounted beneath the right-rear corner of the mechanical chassis 2. The worm gear 47 has a gear shaft 48 rotatably engaging worm gear supporting strips 46. The rear end of the gear shaft 48 extends rearward past the supporting strip 46 and mounts the driven pulley 49 opposing the drive pulley 44 of the loading motor 42. The driven pulley 49 is connected to the driving pulley 44 via a V-shaped endless belt 50.

The first gear block 200a has a worm wheel 251 engaging the worm gear 47. The first gear block 200a also has a driving gear 252 integral with the worm wheel 251. The driving gear 252 engages the gear teeth 38 of the lower loading ring 30 so as to drive the lower loading ring to rotate.

A support shaft 254a extends downward from the lower surface of the gear base 45. The supporting shaft 254a passes through the axial through opening 254 of the first gear block 200a. The first gear block 200a is secured axially to the support shaft 254a by means of a snap ring 254b while remaining free to rotate thereabout.

The driving gear 252 engages a smaller diameter transmission gear 256 of the second gear block 200b. The smaller-diameter transmission gear 256 is integral with a driving gear 255. The driving gear 255 has approximately the same diameter as the driving gear 252 of the first gear block 200a. The driving gear 255 engages the gear teeth 35 of the upper loading ring 29. The external diameter of the smaller diameter transmission gear 256 is smaller than the internal diameter of the driving gear 255.

The second gear block 200b has an axial through opening 257 through its central axis. A support shaft 257a extends downward from the lower surface of the gear base and through the axial through opening 257. A snap ring 257b engages the lower end of the support shaft 257a to axially secure the second gear block on the support shaft. Thus, the second gear block 200b is rotatably suspended from the gear base 45.

As in the preferred embodiment, the gear ratio of the driving gear 252 of the first gear block 200a and the smaller-diameter transmission gear 256 of the second gear block 200b is selected so as to compensate for the difference between the strokes of the movable blocks 23 and 24.

This construction of the first modification makes the transmission gear required in the first gear block in the preferred embodiment unnecessary. Thus, the gear blocks can be more compact for greater ease in mounting on the mechanical chassis 2.

Figure 13:
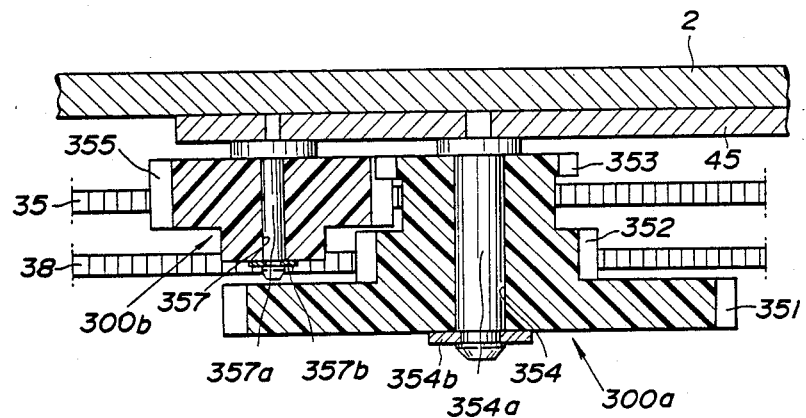
FIG. 13 is a section similar to FIG. 8, but showing another modification of the preferred embodiment of the gear block assembly.
Figure 14A:
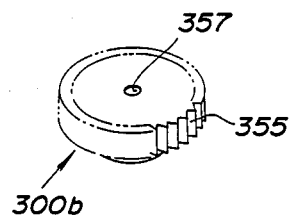
FIGS. 14A and 14B are bottom and top perspective views respectively of the gear blocks of FIG. 13.
Figure 14B:
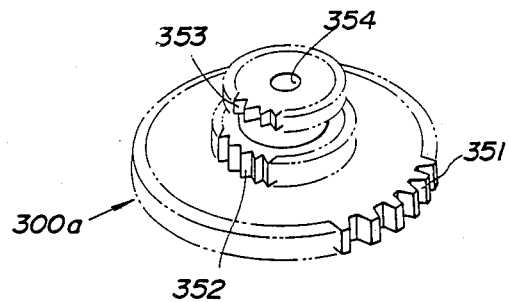

FIGS. 13 and 14 show the second modification to the power train for driving the upper and lower loading rings 29 and 30. The modified power train comprises a first and second gear blocks 300a and 300b.

In this modification, the second gear block 300b is designed to drive the upper loading ring 29 at a lower speed than the lower loading ring 30 which is driven by the first gear block 300a. Therefore, in this modification, the upper loading ring 29 is designed to drive the movable block 23 and the lower loading ring 30 drives the movable block 24. Therefore, the driving directions referred to in the description of the preferred embodiment as "loading direction" and "unloading direction" are reversed. Also, in contradistinction to the embodiment of FIG. 7, the lower loading ring 30 has an arcuate elongated hole 36. The axis of the arcuate elongated hole 36 is concentric with the peripheral edges of loading ring 30. To one side of the elongated hole 36, a projecting pin 37 for engagement with one end of a bias spring 62' projects from the upper surface of the wider section of the lower loading ring 30.

On the other hand, the upper loading ring 29 also has an arcuate elongated hole 39. The axis of the arcuate elongated hole 39 is concentric with the edges of the upper loading ring 30. To one side of the elongated hole 39, a projecting pin 40 projects upward from the upper loading ring 29. The projecting pin 40 is designed to engage one end of a bias spring 62.

The upper loading ring 29 also has a projecting pin 41. The projecting pin 41 is located on the opposite side of the arcuate elongated hole 39 from the projecting pin 40 and projects downward from the upper loading ring 30. The downward projecting pin 41 is associated with a slider 65 (shown in FIG. 4) at various mode positions depending on the mode of operation of the recording and/or reproducing apparatus.

As in the preferred embodiment, the first gear block 300a has a worm wheel 351 engaging the worm gear 47. The worm wheel 351 is integral with a driving gear 352 which engages the gear teeth 38 of the lower loading ring so as to drive the lower loading ring 30 to rotate. The worm wheel 351 is also integral with a transmission gear 353 coaxial to the worm wheel 351 and the driving gear 52. The transmission gear 353 is located above the driving gear 352 and has a diameter smaller than that of the driving gear 352. The transmission gear 353 and the driving gear 352 are separated from each other. A shaft section between the transmission gear 353 and the driving gear 352 has a smaller diameter than the internal diameters of the transmission gear and the driving gear. T- The first gear block 300a has an axial through opening 354 through its central axis. A support shaft 354a extends downward from the lower surface of the gear base 45. The supporting shaft 354a passes through the axial through opening 354 of the first gear block 300a. The first gear block 300a is secured axially to the support shaft 354a by means of a snap ring 354b while remaining free to rotate thereabout. At this position, the transmission gear 353 lies higher than the upper loading ring 29.

The transmission gear 353 engages a driving gear 355 of the second gear block 300b, which has approximately the same diameter as the driving gear 352 of the first gear block 300a. The driving gear 355 engages the gear teeth 35 of the upper loading ring 29. As will be seen from FIG. 13, the transmission gear 353 is thinner than the driving gear 355 of the second gear block 300b. This is because the lower section of the driving gear 355 is designed to enter a groove in the first gear block 300a between the driving gear 352 and the transmission gear 353.

The second gear block 300b has an axial through opening 357 through its central axis. A support shaft 357a extends downward from the lower surface of the gear base and through the axial through opening 357. A snap ring 357b engages the lower end of the support shaft 357a to axially secure the second gear block on the support shaft. Thus, the second gear block is rotatably suspended from the gear base 45.

In this modification, the structure of the second gear block is simpler than in the preferred embodiment. This helps make the power train more compact than in the preferred embodiment.

Figure 15:
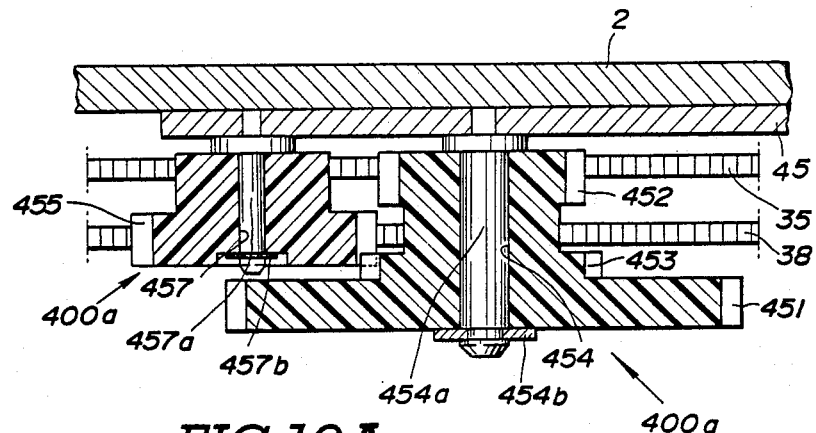
FIG. 15 is a section similar to FIG. 8, but showing a further modification of the preferred embodiment of the gear block assembly.
Figure 16A:
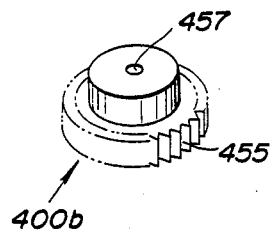
FIGS. 16A and 16B are bottom and top exploded perspective views respectively of the gear blocks of FIG. 15.
Figure 16B:
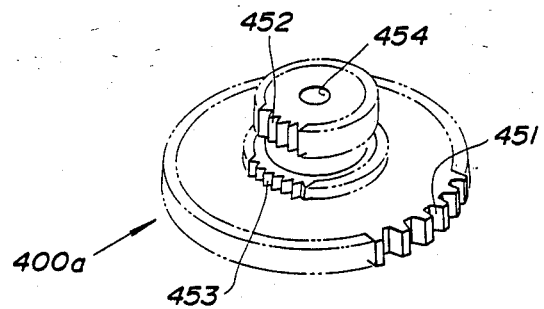

FIGS. 15 and 16 show the third modification to the power train. As in the second modification, the power train of this third modification drives the upper loading ring at a lower speed than of the lower loading ring. In this modification, a first gear block 400a drives the upper loading ring 29 and a second loading ring 400b drives the lower loading ring 30.

As in the preferred embodiment, the first gear block 400a has a worm wheel 451 engaging the worm gear 47. The worm wheel 451 is integral with a driving gear 452 which engages the gear teeth 35 of the upper loading ring 29 so as to drive the upper loading ring 29 to rotate. The worm wheel 451 is also integral with a transmission gear 453 coaxial to the worm wheel 451 and the driving gear 452. The driving gear 452 is located above the transmission gear 453. The transmission gear 453 and the driving gear 452 are separated from each other. A shaft section between the transmission gear 453 and the driving gear 452 has a smaller diameter than the internal diameters of the transmission gear and the driving gear.

The first gear block 400a has an axial through opening 454 through its central axis. A support shaft 454a extends downward from the lower surface of the gear base 45. The supporting shaft 454a passes through the axial through opening 454 of the first gear block 400a. The first gear block 400a is secured axially to the support shaft 454a by means of a snap ring 454b while remaining free to rotate thereabout. At this position, the transmission gear 453 lies higher than the upper loading ring 29.

The transmission gear 453 engages a driving gear 455 of the second gear block 400b, which has approximately the same diameter as the driving gear 452 of the first gear block 400a. The driving gear 455 engages the gear teeth 38 of the lower loading ring 30. The lower section of the driving gear 455 is designed to enter a groove in the first gear block 400a between the driving gear 452 and the transmission gear 453.

The second gear block 400b has an axial through opening 457 through its central axis. A support shaft 457a extends downward from the lower surface of the gear base and through the axial through opening 457. A snap ring 457b engages the lower end of the support shaft 457a to axially secure the second gear block on the support shaft. Thus, the second gear block is rotatably suspended from the gear base 45.

It should be appreciated that though the shown embodiment of the recording and/or reproducing apparatus is applicable for various type of apparatus having rotary heads, the specific PCM audio cassette, for which the preferred embodiment of the recording and/or reproducing apparatus is specifically adapted will be described herebelow with reference to FIGS. 17 to 20.

The magnetic tape cassette generally comprises a casing 131 including an upper half 530 and a lower half 531 which are connected by threaded bolts (not shown) in a per se well-known manner to form a single unit. A transparent window plate 534 is built into the upper surface of the upper half 530. A pair of reel hubs 533 accommodated by the cassette casing 131 rotatably engage a pair of reel shaft insertion apertures 547. The apertures 547 are formed in the lower half 531 at predetermined positions which establish a suitable spacing between the reel hubs 533. Magnetic tape 135 is wound around the reel hubs 533.

A pivotal closure lid 535 is rotatably or pivotally attached at the right and left side walls of the cassette casing near the front end of the tape cassette. When the pivotal closure lid 535 is pivoted away from the front surface of the tape cassette, the magnetic tape 135 is exposed, as shown in FIG. 19. An essentially rectangular cut-out 542 is formed in the front edge of the lower half 531. When the magnetic tape cassette is inserted into a PCM recorder which will be briefly discussed later, a tape guide system or a device constituting part of a tape retaining mechanism (not shown) is inserted into the cut-out 542 and pulls out some of the tape 135 for loading onto a rotary head of the PCM recorder. A sliding closure member 536 engages the lower half 531 and covers and exposes the cut-out 542 as it slides back and forth.

Figure 18:
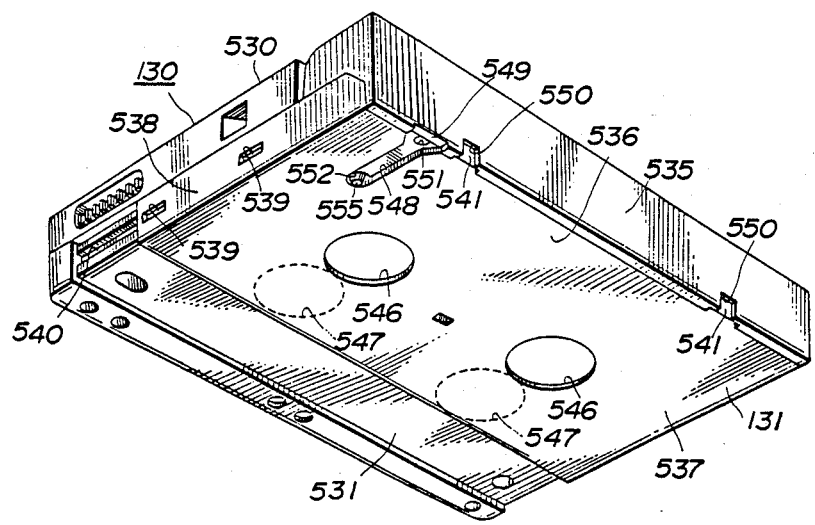
FIG. 18 is a view similar to FIG. 17 but viewing the magnetic tape cassette from below.

While the tape cassette is not in use, the pivotal closure lid 535 opposes a front opening in the front face of the casing 131 to cover the latter. At the same time, the sliding closure 536 is in its forwardly-shifted position in which it covers the cut-out 542 of the lower half 531 and thus prevents the tape guide system from reaching into the tape cassette for the tape, as shown in FIG. 18. The closure lid 535 can pivot away from the front surface of the cassette to expose the magnetic tape 135 and the sliding closure member 536 can move to the rear to expose the cut-out 542 so that the tape guide system can reach into the cut-out 542 to draw some of the magnetic tape 135 out of the cassette casing for loading onto a rotary drum for recording or playback. Thereafter, when the recording or layback is over and the tape cassette is returned to the stand-by state, the pivotal closure lid 535 and the sliding closure member 536 are returned to the aforementioned closed positions. Throughout the rest of this document, the positions of the pivotal closure lid 535 and the sliding closure 536 in which they cover the front opening and the cut-out 542 respectively will be referred to as a "closed position" and the position of the lid 535 and the sliding closure 536 in which they expose the front opening and the cut-out 542 will be referred to as an "open position".

The cut-out 542 of the lower half 531 extends over a predetermined width so as to expose the rear surface of the magnetic tape 135 stretched between tape guides at either end of the front opening. During recording or reproduction, a device constituting part of the tape handling system or the tape guide system projects into the cut-out 542 and draws out a section of the magnetic tape 135. The tape handling system is part of the PCM recorder.

The pivotal closure lid 535 is elongated along the major dimension of the front opening and is pivotably attached to the front of the cassette casing 131 by means of pivot shafts (not shown). Thus, the pivotal closure lid 535 can be pivoted to selectively cover and expose the front opening of the cassette casing 131. The closure lid 535 also has a cut-out 549 forming a shallow but relatively wide groove through its lower edge near one side. In addition, cut-away portions 550 are formed by cutting small grooves into the lower edge of the lid 535 toward the left and right extremes of the cut-out 542 of the lower section 531.

The sliding closure member 536 has a flattened U-shaped configuration and is so mounted on the lower half 531 of the cassette casing 131 that it can slide back and forth parallel to the lower surface of the lower cassette half 531. Apertures 546 corresponding to the reel shaft insertion apertures 547 are formed in the sliding closure member 536 in such positions that after the sliding closure member 536 slides all the way backwards to expose the cut-out 542, the apertures 546 are respectively aligned with the reel shaft insertion apertures 547.

The sliding closure member 536 comprises a flat plate 537 which lies parallel to the lower surface of the lower half 531 and side plates 538 along the left and right sides of the flat plate 537 while lie parallel to the outer surfaces of the left and right side walls of the lower half 531. Flanges (not clearly shown) are formed by bending the upper ends of the side plates 538 inwards. The flanges are restrained vertically but not horizontally between the side walls of the upper and lower sections 530, 531 after the casing 131 is assembled.

Contact pieces 541 extend upwards perpendicularly from the front edge of the flat plate 537 at positions opposite the cut-away portions 550 of the closure lid 535. The contact pieces 541 enable the recording-reproducing apparatus to slide the closure 536 to the rear in preparation for opening the cassette 130 in a manner described later.

A hook 545 is formed on the front edge of the flat plate 537. The hook 545 is centered between the contact pieces 541. One leg 544b of a torsion spring 544, the coil 544a of which is housed in the front portion of the lower half 531, engages the hook 545. The torsion spring exerts a forward biasing force on the sliding closure member 536. When the sliding closure member 536 is in its open position, the torsion spring 544 is stressed and exerts a counteracting force biasing the sliding closure member 536 toward is closed position.

The sliding closure member 536 is also formed with a circular hole 552 and a semicircular cut-out 551. The semicircular cut-out 551 opens onto the front edge of the sliding closure member 536. A thin groove 548 in the lower surface of the sliding closure member 536 connects the hole 552 and the cut-out 551. The groove 548 has a tapered end opening onto the front end of the sliding closure member 535 opposite the cut-out 549. The hole 552 add the cut-out 551 are so arranged as to engage a locking projection or head 555 of a locking lever 553 which is integrally formed with the lower half 531.

Figure 17:
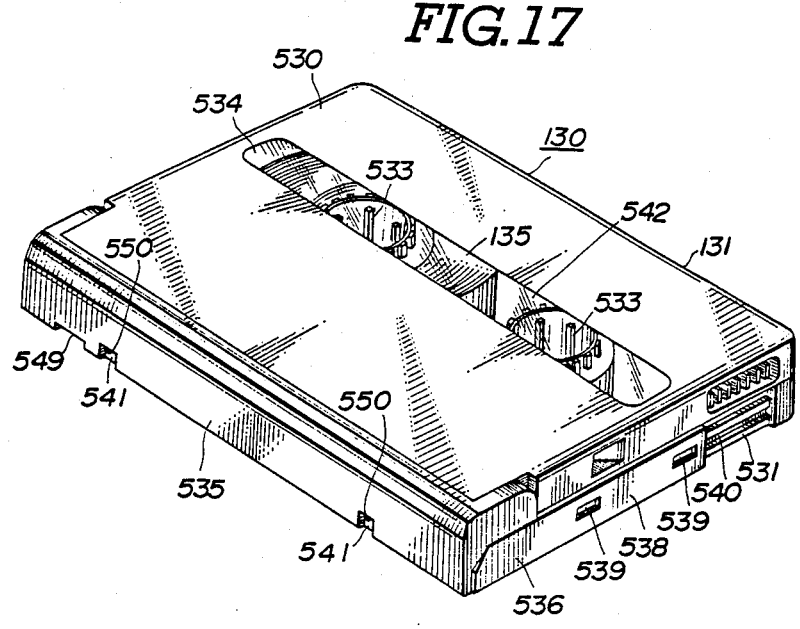
FIG. 17 is a perspective view of a magnetic tape cassette suitable for use in the recording and/or reproducing apparatus of FIGS. 1 to 9.

As shown in FIGS. 17 and 18, the lower half 531 of the casing is formed with a pair of guide grooves 540 extending along each of the side walls parallel to each other and to stepped rests. Neither the rests nor the guide grooves 540 are as deep as the arms of the closure lid 535 are thick. The guide grooves 540 also receive the upper edges of the sliding closure 536. Also, the guide grooves 540 slidably receive inwardly depressed indentations 539 in the side plates 538 of the sliding closure 536. Sliding engagement between the grooves 540 and the edges and the indentations 536 guides sliding movement of the sliding closure 509 with respect to the cut-out 542 along the side walls of the lower section.

In order to handle the aforementioned magnetic tape cassette of FIGS. 17 to 20, the recording and/or reproducing apparatus according to the present invention, is provided with the cassette holder as set forth. One example of the cassette holder to be provided in the preferred embodiment of the recording and reproducing apparatus according to the invention will be described herebelow with reference to FIGS. 21 to 26.

The cassette holder 501 generally comprises a lower holder 502 and an upper holder 503. The lower holder 503 is made from a metal plate and has a bottom plate 504 and a pair of side walls 505 extending vertically from the edges of the bottom plate. The bottom plate 504 has a front edge with a cut-out 506 near or at its center. The cut-out 506 is narrower at its outer ends than near its center. The bottom plate 504 is also formed with circular openings 506' for receiving reel shafts (not shown) of a PCM audio player system. A pair of projections 507 project from the front edge of the bottom plate, i.e. from the front edge of the cut-out 506. The projections 507 have upwardly bent front ends which form upwardly extending claws 508. The bottom plate 504 also as an elongated upward projection 509 near its front edge and transversely offset from the center of the cassette holder. The projection 509 lies parallel to the longitudinal axis of the cassette holder. The projection 509 has tapered front and rear ends 509a and 509b.

It should be noted that, in the shown embodiment, the projection 509 is integral with the bottom plate 4 and formed by pressing.

The upper holder 503 is made of a synthetic resin and has a ceiling plate 510 and a pair of descending side walls 511 extending from its transverse edges. The side walls 511 are fixed to the side walls 505 of the lower holder 502 to form an opened box-shaped cassette receptacle open at its front and rear ends.

Figure 22:
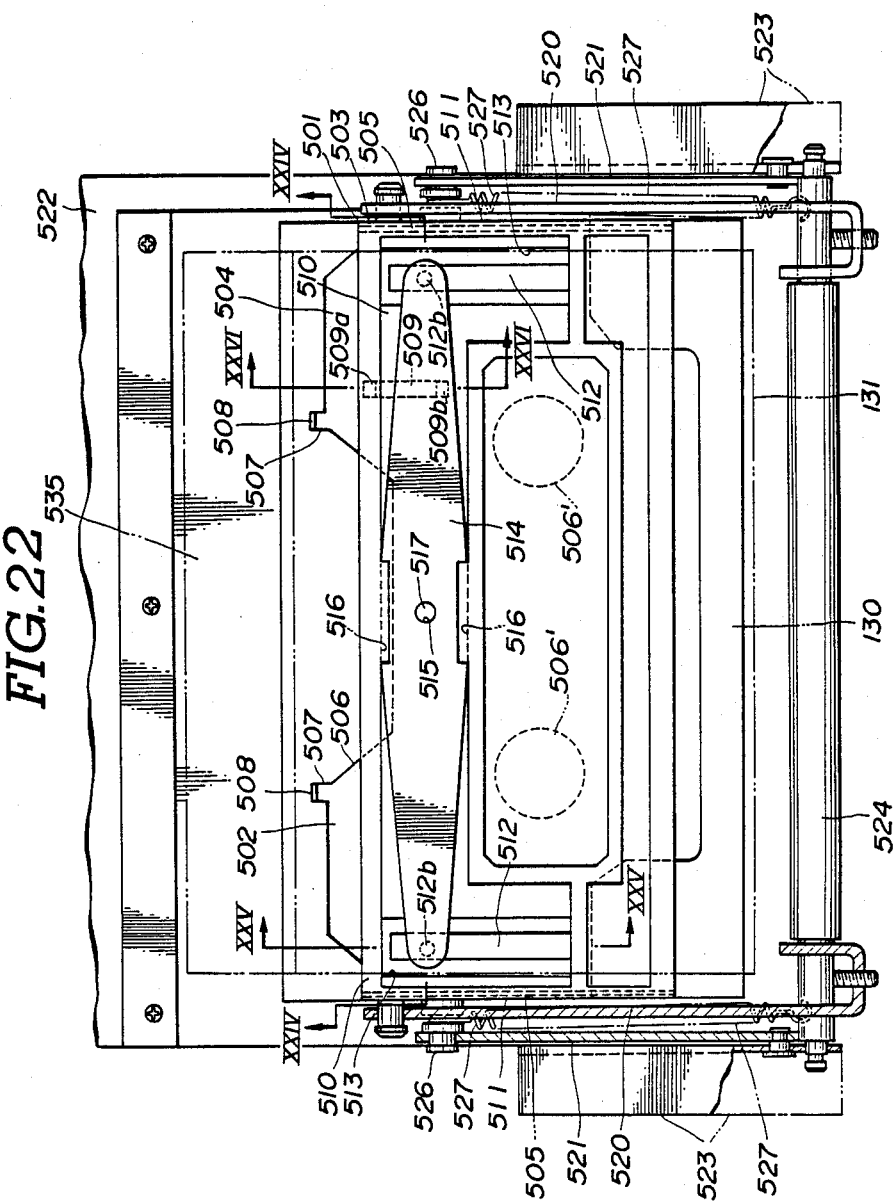
FIG. 22 is a plan view of the cassette holder of FIG. 21.

The upper holder 503 has depression members 512 extending longitudinally along the transverse edges of the ceiling plate 510. In the shown embodiment, the depression members 512 are formed integrally with the upper holder 503 and are connected to the major section of the ceiling plate 510 at their rear ends. As best shown in FIG. 22, the ceiling plate 510 has cut-outs 513 surrounding the depression members 512. Each depression member 512 has a section 512a extending into the interior of the cassette holder 501 and a second section 512b extending upward from the upper plane of the ceiling plate 510. The section 512b of the depression member 512 is in contact with a leaf spring 514 which rests on the upper plane of the ceiling late 510 and has is wider at its center than at its longitudinal ends. The width of the leaf spring 514 gradually tapers towards its ends. A through opening 515 at the center of the leaf spring 514 engages a projection 517 extending upward from the upper plane of the ceiling plate 510.

The ceiling plate 510 has a pair of longitudinally spaced grooves 516 on its upper surface near its front edge. The grooves 516 are intended to receive the front and rear edges of the central portion of the leaf spring 514, as shown in FIG. 22. The grooves 516 cooperate with the projection 517 to fix the leaf spring 514 to the upper surface of the ceiling plate 510. The leaf spring 514 normally biases the depression member 512 downwards. With this arrangement, when the magnetic tape cassette 130 is inserted into the internal space of the cassette holder 501, the cassette is depressed downward toward the lower holder 502 by the leaf spring 514 and the depression member 512.

Figure 23:
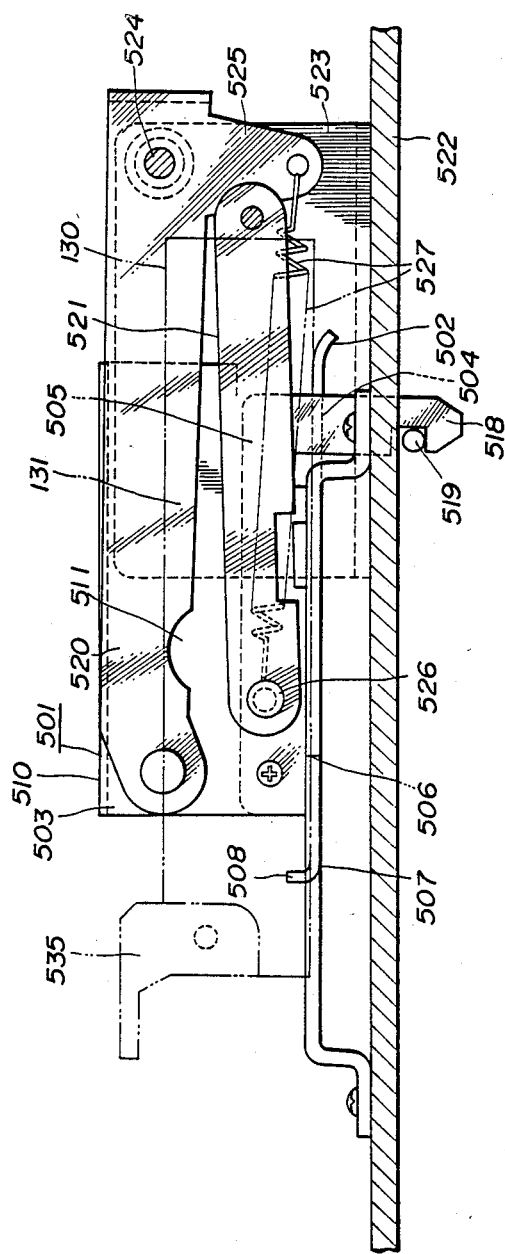
FIG. 23 is a side elevation of the cassette holder of FIG. 21, but showing the magnetic tape cassette upon completion of loading.

As shown in FIGS. 21 and 23, the lower holder 512 has a lever 518 extending downward therefrom. A recess 518a is formed in the front vertical face of lever 518. When the cassette holder 501 is lowered into the recording and reproduction apparatus, the lever 518 passes through an aperture in a chassis 522 and the recess 518a engages an eject-lock pin 519, which will be discussed again later.

The cassette holder 501 is supported by a mechanical chassis 522 of the PCM audio player system by means of pivotable arms 520 and 521. The pivotable arms 520 and 521 move the cassette holder 501 up and down with respect to the mechanical chassis 522. Although it has not been illustrated in the drawings, various PCM audio player mechanisms, such as a pair of reel shafts, a tape-loading mechanism, a tape-drive system and so forth are mounted on the mechanical chassis.

A pair of supporting strips 523 extend upward from the mechanical chassis 522. The upper pivotable arms 520 are pivotably supported by the supporting strips 523 by means of a pivot shaft 524 which is rotatable with respect to the supporting strip 523. Each upper pivotable arm 520 has a transverse extension 525 on its lower edge near the end connected to the supporting strip 523. The pivotable arms 520 also have front ends connected to the front ends of the side walls 11 of the cassette holder 501. The front ends of the pivotable arms 20 are pivotably fastened to the side walls 511 of the cassette holder 501.

The lower pivotal arms 521 are shorter than the upper pivotal arms 520. The lower pivotal arms 521 are also pivotally connected to the supporting strip 523. The pivot axes of the lower pivotal arms 521 are below the pivot axes of the pivot shafts 524 of the upper pivotal arms 520 and slightly forward of the pivotal shafts 524. The front end of the lower pivotal arms 521 are pivotally connected to the side walls 511 of the lower holder 502 through pivot pins 526. The pivot axes of the pivot pins 526 are disposed below and rearward of the pivot axes about which the upper pivotal arms 520 pivot relative to the side walls 511.

Tension springs 527 are stretched between the lower end of the extensions 525 and the pivot pins 526. As will be appreciated from FIGS. 21 and 23, the distance between the lower end of the extensions 525 and the pivot pins 526 decreases when the cassette holder 501 moves away from the mechanical chassis 522 and increases when the cassette holder 501 approaches the mechanical chassis. Therefore, when the cassette holder 501 rests on the mechanical chassis 522, the tension of the tension spring 527 is at its greatest and thus it biases the upper arms 520 to pivot its front end upward. Therefore, unless a locking engagement is established by a locking mechanism for the cassette holder, which will be explained later, the cassette holder 501 will be held at the this upper position shown in FIG. 21 where it allows insertion of the magnetic tape cassette 130.

In the condition of the cassette holder shown in FIG. 21, the magnetic tape cassette 130 is inserted into the cassette holder 501. The force exerted through the magnetic tape cassette 130 pivots the pivotal arms 520 and 21 counterclockwise as viewed in FIG. 21 to lower the cassette holder 501 toward the mechanical chassis 522. During this lowering motion of the cassette holder 501, the reel shafts, tape guide mechanism, the tap drive mechanism and so forth pass through the bottom plate 504 of the cassette holder to place the magnetic tape cassette in a loading condition. At the lowermost position in which the cassette holder 501 rests on the mechanical chassis, the recess 519 of the lever 518 of the cassette holder 501 comes into engagement with a locking pin 519a to establish a locking engagement in order to hold the cassette holder in place.

In the shown construction, when the tape cassette is not in use, the closure lid 535 is in its closed position shown in FIGS. 17 and 18 to cover the front opening. At the same time, the sliding closure member 509 is in its closed position (FIGS. 17 and 18), and thus covers the cut-out 542. In this case, the locking head 555 of the locking lever 553 is in engagement with the hole 552 as shown in FIG. 18. As will be apparent from FIG. 18, the locking head 555 of the locking lever 53 lies fully within the groove 509n so that it does not protrude downwards from the lower surface of the sliding closure member 536.

When the tape cassette is to be used in a PCM recorder, the cassette is first inserted into the preferred embodiment of a cassette holder 501, according to the invention. The operation of the preferred embodiment of the cassette holder in the PCM recorder will be described herebelow.

During insertion of the magnetic tape cassette 130 into the cassette holder, the tapered rear end 509b of the projection 509 projecting from the lower holder 502 passes through the cut-out 549 and enters the groove 548 of the sliding shutter member 537. Further frontward movement of the magnetic tape cassette 130 brings the rear end 509b of the projection 509 into contact with the locking head 555 of the locking lever 553. As a result, the locking head 555 is urged upwards and held there by contact with the top surface of the projection 509. While the locking head 555 is held upward, the claws 508 of the projections 507 pass through the cut-outs 550 in the lower edge of the closure lid 535 and engage the contact members 541 on the front edge of the sliding shutter member 537. This exerts a force acting against the force inserting the magnetic tape cassette 130 into the cassette holder 130 on the sliding shutter member 536 so as to bias the latter rearwards. This rearward counter force shifts the locking head 555 further upwards along the tapered edge 552a of the hole 552. This release the locking engagement between the locking head 555 and the hole 552 and so allows further rearward movement of the sliding shutter member 536. After slight rearward movement of the sliding shutter member 536, the locking head 555 comes into contact with the upper surface of the sliding shutter member and thereafter is held in the upper, unlocked position. Therefore, the sliding shutter member 536 is free to move rearward against the biasing force exerted by the torsion spring 544.

When the magnetic tape cassette 130 is fully inserted into the cassette holder 501 and thus reaches the set position, the sliding shutter member 536 will be in its predetermined rearmost position, wherein the openings 546 are in alignment with the reel shaft insertion apertures 547 in the lower half 531 and cut-out 542 is exposed to accept the tape guide system and/or the tape retaining mechanism. In this position, the locking head 555 of the locking lever 553 opposes the front end cut-out 551 of the sliding shutter member 536. The resilient force exerted by the deformed locking lever 553 drives, the locking head 555 downward into engagement with the cut-out 551. Thus, locking engagement retaining the sliding shutter member 536 in its rearmost position is established.

When the sliding shutter member 536 is its closed position, the upper edge thereof restricts pivotal movement of the pivotal lid 535 due to contacting with the lower edge of the arms. When the sliding shutter member 536 is shifted to the rearmost position, the pivotal lid 535 becomes free from this restriction and is free to pivot about its pivot.

After the magnetic tape cassette 130 is set in the cassette holder 501, the pivotable arms 520 and 521 pivot to shift the cassette holder from the position of FIG. 21 to the position of FIG. 23. During this downward movement of the cassette holder, an actuation pin (not shown) projecting from the mechanism chassis comes into contact with the lower edge of the pivotal lid 535 and pushes the latter upwards. As a result, the pivotal lid 535 is pivoted upwards to the open position, as shown in FIGS. 23 and 19.

On the other hand, when the magnetic cassette is to be ejected from the recording and reproducing apparatus, the locking engagement between the eject-lock pin 519 and the locking recess 518a of the lever 518 is released by depression of an eject button provided in the recording and reproducing apparatus. Releasing the locking engagement allows the cassette holder 501 to move upwards in accordance with the resilient force exerted on the pivotal arms 520. During this upward movement, the pivotal lid 535 contacts with an appropriate member to be moved back to the closed position.

At the upper position of the cassette holder 501, the magnetic tape cassette 130 can be pulled rearward. As a result, the locking head 555 of the locking lever 553 comes into contact with the tapered front end 509a of the projection 509. As a result, the locking head 555 is pushed upward against the resilient force exerted by the lever 553. At the same time, the spring force of the torsion spring 544 acts to shift the sliding shutter member 536 frontward. The spring force applied to the sliding shutter member 536 moves the locking head 555 further upwards to be released from engagement with the cut-out 551. Therefore, the sliding shutter member 536 becomes free to moves frontward to its closed position automatically due to the spring force of the torsion spring 544.

At the forwardmost position, the locking head 555 again opposes the hole 552 through the sliding shutter member 536 and engages therewith. Thus, locking engagement restricting movement of the sliding shutter member 536 is established.

As will be appreciated, providing the lock at the open position of the sliding shutter member 536 successfully prevents accidental closure of the sliding shutter member due to the spring force constantly exerted thereon by the torsion spring 544. On the other hand, providing the lock release mechanism active both upon insertion of the magnetic tape cassette and upon ejection of the cassette makes it possible to lock the sliding shutter member in its open position.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A recording and/or reproducing apparatus for a magnetic tape in a magnetic tape cassette, comprising:
   first means for receiving said magnetic tape cassette to drivingly cooperate therewith;
   a rotary head means having an axis and a top surface and adapted to record and/or reproduce signals on said magnetic tape;
   second means for extracting a predetermined length of magnetic tape from said magnetic tape cassette and moving said predetermined length of magnetic tape to various positions corresponding to various operation modes of said recording and/or reproducing apparatus, said second means including first and second movable members respectively movable along predetermined first and second paths to various positions for positioning said magnetic tape at one of said various positions corresponding to a selected one of said various operation modes;
   third means for mounting said rotary head means on said recording and/or reproducing apparatus such that the axis of said rotary head means lies oblique to a vertical axis in such a manner that first ends of said first and second paths, which first ends of said first and second paths lie adjacent said rotary head means and at which said first and second movable members place said magnetic tape at a loading mode position for recording and reproduction, are arranged on a plane extending through the uppermost t and the lowermost point of the top surface of said rotary head means, and proximal to said first means, whereby the difference between the lengths of maximum stroke of said first and second movable members along said first and second paths can be minimized; and fourth means for driving said recording and/or reproducing apparatus through various modes of operation, said fourth means actuating said second means so as to shift said first and second members along said first and second paths to an extent in accordance with said mode of operation of said recording and/or reproducing apparatus.

2. The recording and/or reproducing apparatus as set forth in claim 1, wherein said third means mounts said rotary head means in such a manner that the axis of said rotary head means lies oblique to the vertical axis such that said plane extending through said uppermost point and said lowermost point of said top surface of said rotary head means lies oblique to a reference line connecting the reel axes of a pair of tape reels in said magnetic tape cassette.

3. The recording and/or reproducing apparatus as set forth in claim 2, wherein said fourth means shifts said first and second movable members along said first and second paths simultaneously.

4. The recording and/or reproducing apparatus as set forth in claim 3, wherein said fourth means moves said first and second movable members of said second means at different speeds so as to compensate for the difference between the strokes of said first and second members according to the difference between the lengths of said first and second paths.

5. The recording and/or reproducing apparatus as set forth in claim 1, which further comprises a mechanical chassis mounting said rotary head means thereon and defining said first and second paths for said first and second movable members such that the first end of said first path lies near one longitudinal edge of said mechanical chassis such that said first ends of said first and second paths lie on diametrically opposite sides of said rotary head means, and such that the longitudinal distance between said first means and said first end of said first path is less than that between said first means and said first end of said second path.

6. The recording and/or reproducing apparatus as set forth in claim 5, wherein said first and second members of said second means each comprise loading posts engageable with said magnetic tape within said magnetic tape cassette for extracting said length of magnetic tape as said first and second movable members are shifted from said second ends toward said first ends of said first and second paths.

7. The recording and/or reproducing apparatus as set forth in claim 6, wherein said second means further comprises first and second loading rings cooperative with said first and second movable respectively and rotatable about the vertical axis extending through the center of said rotary head means, said first and second loading rings being adapted to be driven by a loading motor through a power train so as to shift said first and second members between said first and second ends of said first and second paths according to rotation thereof.

8. The recording and/or reproducing apparatus as set forth in claim 7, wherein said power train is adapted to drive said first and second loading rings at different speeds, which speed difference compensates for the difference between the strokes of said first and second movable members due to the difference between the lengths of said first and second paths.

9. The recording and/or reproducing apparatus as set forth in claim 8, which further comprises a brake mechanism associated with a reel base in said first means engageable with a tape reel housed in a cassette casing of said magnetic tape cassette, and means cooperative with at least one of said first and second loading rings for operating said brake mechanism to various mode positions corresponding to angular positions of said first and second loading rings so as exert a corresponding braking force on said reel base.

10. A loading mechanism of a recording and/or reproducing apparatus including a rotary head having a magnetic head rotatable with a rotary head having an essentially flat top surface for recording and/or reproducing information on a magnetic tape housed within a magnetic tape cassette, comprising:

first means for receiving said magnetic tape cassette to drivingly cooperate therewith, said first means including a pair of reel bases engageable to a pair of tape reels housed in a cassette casing of said magnetic tape cassette;

second means for extracting a predetermined length of magnetic tape wound around said tape reels in said magnetic tape cassette and moving said predetermined length of magnetic tape to various positions corresponding to various operation modes of said recording and/or reproducing apparatus, said second means including first and second movable members respectively movable to various mode positions according to the operation mode of said recording and/or reproducing apparatus along respectively corresponding predetermined first and second paths, which paths have first ends located near said rotary head and second ends remote from said rotary head and proximal to said first means, for orienting said first and second movable members at said first ends of said first and second paths establishing tape loading for recording and reproduction of information on said magnetic tape;

third means for mounting said rotary head on said recording and/or reproducing apparatus such that the flat top surface lies oblique to a horizontal plane and the axis of rotation of said rotary head assembly lies oblique to a vertical axis in such a manner that said first ends of said first and second paths and a reference line connecting the uppermost point and the lowermost point on said top surface lie in the same vertical plane, and such that the difference between the lengths of said first and second paths can be minimized; and fourth means for driving said second means so as to shift said first and second members along said first and second paths according to said mode of operation of said recording and reproducing apparatus.

11. The loading mechanism as set forth in claim 10, wherein said third means mounts said rotary head in such a manner that the axis of said rotary head lies oblique to the vertical axis such that said plane extending through said uppermost point and said lowermost point of said top surface of said rotary head lies oblique to a reference line connecting the reel axes of a pair of tape reels in said magnetic tape cassette.

12. The loading mechanism as set forth in claim 11, wherein said fourth means shifts said first and second members along said first and second paths simultaneously.

13. The loading mechanism as set forth in claim 12, wherein said fourth means moves said first and second members of said second means at different speeds so as to compensate for the difference between strokes of said first and second members according to the difference between the lengths of said first and second paths.

14. The loading mechanism as set forth in claim 13, which further comprises a mechanical chassis mounting said rotary head thereon and defining said first and second paths for said first and second members such that the first end of said first path lies near one longitudinal edge of said mechanical chassis, such that said first ends of said first and second paths lie on diametrically opposite sides of said rotary head and such that the longitudinal distance between said first means and said first end of said first path is less than that between said first means and said first end of said second path.

15. The loading mechanism as set forth in claim 14, wherein said first and second members of said second means each comprise loading posts engageable with said magnetic tape within said magnetic tape cassette for extracting said length of magnetic tape as said first and second members are shifted from said second ends toward said first ends of said first and second paths.

16. The loading mechanism as set forth in claim 15, wherein said fourth means further comprises first and second loading rings cooperative with said first and second members respectively and rotatable about the vertical axis extending through the center of said rotary head, said first and second loading rings being adapted to be driven by a loading motor through a power train so as to shift said first and second members between said first and second ends of said first and second paths according to rotation thereof.

17. A recording and/or reproducing apparatus for a magnetic tape cassette, comprising:
a rotary head having a magnetic head rotatable with a rotary drum having an essentially flat top surface;
first means for receiving said magnetic tape cassette to drivingly cooperate therewith, said first means including a pair of reel bases engageable to a pair of tape reels housed in a cassette casing of said magnetic tape cassette;
second means for extracting a predetermined length of magnetic tape wound around said tape reels in said magnetic tape cassette and moving said predetermined length of magnetic tape to various positions corresponding to various operation modes of said recording and reproducing apparatus, said second means including first and second loading rings carrying first and second movable members, said first and second loading rings being movable to variable angular positions according to the operation mode of said recording and/or reproducing apparatus and driving said first and second movable members along respectively corresponding predetermined first and second paths, which paths have first ends located near said rotary head and second ends remote from said rotary head and proximal to said first means, for orienting said first and second movable members at said first ends of said first and second paths establishing tape loading for recording and reproduction of information on said magnetic tape;
third means for mounting said rotary head on said recording and/or reproducing apparatus such that the flat top surface lies oblique to a horizontal plane and the axis of rotation of said rotary head assembly lies oblique to a vertical axis in such a manner that said first ends of said first and second paths and a reference line connecting the uppermost point and the lowermost point on said top surface lie in the same vertical plane, and such that the difference between the lengths of said first and second paths can be minimized; and
fourth means, associated with said reel bases, and cooperative with at least one of said first and second loading rings, for applying brakes to said bases at various braking magnitudes so as to restrict rotation of said reel base in a first braking mode, for exerting resistance to rotation of said reel base but allowing rotation of said reel base at a limited speed in a second braking mode, and for allowing free rotation of said reel bases in a third braking mode, said brake mechanism being cooperative with said second means for varying said braking mode among said first, second and third braking modes according to the position of said second means corresponding the operation mode of said recording and/or reproducing apparatus; and
fifth means for driving said recording and/or reproducing apparatus through various modes of operation, said fourth means actuating said second means so as to shift said first and second members, along said first and second paths according to said mode of operation of said recording and reproducing apparatus.

18. The recording and/or reproducing apparatus as set forth in claim 17, which further comprises a mechanical chassis mounting said rotary head thereon and defining said first and second paths for said first and second members such that the first end of said first path lies near one longitudinal edge of said mechanical chassis, such that said first ends of said first and second paths lie on diametrically opposite sides of said rotary head means, and such that the longitudinal distance between said first means and said first end of said first path is less than that between said first means and said first end of said second path.

19. The recording and/or reproducing apparatus as set forth in claim 18, wherein said first and second movable members of said second means each comprise loading posts engageable with said magnetic tape within said magnetic tape cassette for extracting said predetermined length of magnetic tape as said first and second movable members are shifted from said second ends toward said first ends of said first and second paths.

20. The recording and/or reproducing apparatus as set forth in claim 19, wherein said first and second loading rings are cooperative with said first and second members respectively and are rotatable about the vertical axis extending through the center of said rotary head, said first and second loading rings being adapted to be driven by a loading motor through a power train so as to shift said first and second members between said first and second ends of said first and second paths according to rotation thereof.

21. The recording and/or reproducing apparatus as set forth in claim 20, wherein said fourth means comprises first and second brake arms having first and second brake shoes independently movable toward and away from the outer periphery of said reel bases to realize said first, second and third braking modes.

22. The recording and/or reproducing apparatus as set forth in claim 21, wherein said fourth means further comprises cooperation means coupling at least one of said first and second loading rings with said first and second brake arms for controlling the positions of said first and second brake arms according to the angular position of said one of first and second loading rings.

23. The recording and/or reproducing apparatus as set forth in claim 22, wherein said cooperation means comprises a slider extending substantially along one edge of said mechanical chassis and movable according to angular movement of said one of said first and second loading rings to control the positions of said first and second brake arms.

24. The recording and/or reproducing apparatus as set forth in claim 23, wherein said cooperation means further comprises a pivotal lever associated with said slider at one end and associated with said first and second brake arms at the other end.

25. The recording and/or reproducing apparatus as set forth in claim 23, which further comprises sixth means adapted to regulate the tension on said magnetic tape while said recording and/or reproducing apparatus is in at least one preselected mode of operation.

26. The recording and/or reproducing apparatus as set forth in claim 25, wherein said sixth means is cooperative with said slider to be actuated to a position in which said sixth means regulates tape tension at the specific slider position corresponding to said preselected operational mode of said recording and/or reproducing apparatus.

27. A recording and/or reproducing apparatus for a magnetic tape cassette, comprising;
 a rotary head means having a magnetic head rotatable with a rotary drum having an essentially flat top surface;
 first means for receiving said magnetic tape cassette to drivingly cooperate therewith, said first means including a pair of reel bases engageable to a pair of tape reels housed in a cassette casing of said magnetic tape cassette;
 second means for extracting a predetermined length of magnetic tape wound around said tape reels in said magnetic tape cassette and moving said predetermined length of magnetic tape to various positions corresponding to various operation modes of said recording and/or reproducing apparatus, said second means including first and second movable members respectively movable to various mode positions according to the operation mode of said recording and/or reproducing apparatus along respectively corresponding predetermined first and second paths, which paths have first ends located near said rotary head and second ends remote from said rotary head and proximal to said first means,
 third means for mounting said rotary head means on said recording and/or reproducing apparatus such that the flat top surface lies oblique to a horizontal plane and the axis of rotation of said rotary head assembly lies oblique to a vertical axis in such a manner that said first ends of said first and second paths and a reference line connecting the uppermost point and the lowermost point on said top surface lie in the same vertical plane, and
 fourth means for driving recording and/or reproducing apparatus through various modes of operation, said fourth means actuating said second means so as to shift said first and second members along said first and second paths according to said operational mode of said recording and/or reproducing apparatus, said fourth means including a loading motor driven to shift said first and second movable members among various mode positions corresponding to said operational modes of said recording and/or reproducing apparatus, and a power train adapted to move said first and second members of said second means at different speeds so as to compensate for the difference between the strokes of said first and second members.

28. The recording and/or reproducing apparatus as set forth in claim 27, which further comprises a mechanical chassis mounting said rotary head means thereon and defining said first and second paths for said first and second members such that the first end of said first path lies near one longitudinal edge of said mechanical chassis, such that said first ends of said first and second paths lie on diametrically opposite sides of said rotary head means, and such that the longitudinal distance between said first means and said first end of said first path is less than that between said first means and said first end of said second path.

29. The recording and/or reproducing apparatus as set forth in claim 28, wherein said first and second members of said second means each comprise loading posts engageable with said magnetic tape within said magnetic tape cassette for extracting said predetermined length of magnetic tape as said first and second movable members are shifted from said second ends toward said first ends of said first and second paths.

30. The recording and/or reproducing apparatus as set forth in claim 29, wherein said fourth means further comprises first and second loading rings cooperative with said first and second movable members respectively and rotatable about the vertical axis extending through the center of said rotary head assembly, said first and second loading rings being adapted to be driven by a loading motor through a power train so as to shift said first and second members between said first and second ends of said first and second paths according to rotation thereof.

31. The recording and/or reproducing apparatus as set forth in claim 30, wherein said power train comprises first and second rotary blocks, said first rotary block being adapted to drive said first loading ring at a first predetermined speed and said second rotary block being adapted to drive said second loading ring at a second predetermined speed.

32. The recording and/or reproducing apparatus as set forth in claim 31, wherein said first and second loading rings have gear teeth on their outer peripheries, and said first and second rotary blocks have first and second driving gears respectively engageable with said gear teeth of said first and second loading rings.

33. The recording and/or reproducing apparatus as set forth in claim 32, wherein said power train further includes a driving shaft driven by said loading motor and a worm gear adapted to be driven said driving shaft, and said first rotary block has a worm wheel to be driven by said worm gear and so being coupled with said second rotary block to drive the latter.

34. The recording and/or reproducing apparatus as set forth in claim 33, wherein said first and second driving gears of said first and second rotary blocks have substantially the same gear ratio, and said first and second rotary blocks have first and second transmission gears having gear ratios selected to provide the differential shifting speed of said first and second members of said second means.

35. The recording and/or reproducing apparatus as set forth in claim 33, wherein said first and second driving gears of said first and second rotary blocks have substantially the same gear ratio, and said first rotary block has a transmission gear engageable with said second driving gear of said second rotary block and having a smaller diameter than said second driving gear, the diameters of said first and second transmission gears being selected to provide the differential shifting speed of said first and second members of said second means.

36. The recording and/or reproducing apparatus as set forth in claim 33, wherein said first and second driving gears of said first and second rotary blocks have substantially the same gear ratio, and said first rotary block has a transmission gear engageable with said second driving gear of said second rotary block and having a greater diameter than said second driving gear, the diameters of said first and second transmission gears being selected to provide the differential shifting speed of said first and second members of said second means.

37. A recording and/or reproducing apparatus for a magnetic tape cassette, comprising:
   first means for receiving said magnetic tape cassette to drivingly cooperate therewith, said first means including a pair of reel bases engageable with tape reels housed within said magnetic tape cassette;
   a rotary head means adapted to record and/or reproduce signals on said magnetic tape, said rotary head means being arranged in a position laterally offset from a longitudinally extending center axis extending across a lateral intermediate point between said reel bases;
   second means for extracting a predetermined length of magnetic tape from said magnetic tape cassette and moving said predetermined length of magnetic tape to various positions corresponding to various operation modes of said recording and/or reproducing apparatus, said second means including first and second movable members respectively movable along predetermined first and second paths to various positions for positioning said magnetic tape at one of said various positions corresponding to a selected one of said various operation modes;
   third means for mounting said rotary head means on said recording and/or reproducing apparatus such that the axis of said rotary head means lies oblique to a vertical axis in such a manner that first ends of said first and second paths, which first ends of said first and second paths lie adjacent said rotary head means and at which said first and second movable members place said magnetic type at a loading mode position for recording and reproduction are arranged on a plane extending though the uppermost point and the lowermost point of the top surface of said rotary head means, and proximal to said first means, whereby the difference between the lengths of maximum stroke of said first and second movable members along said first and second paths can be minimized; and
   fourth means for driving recording and/or reproducing apparatus through various modes of operation, said fourth means actuating said second means so as to shift said first and second members along said first and second paths to an extent in accordance with said operational mode of said recording and/or reproducing apparatus.

38. A recording and/or reproducing apparatus for a magnetic tape cassette, comprising:
   first means for receiving said magnetic tape cassette to drivingly cooperate therewith, said first means including a pair of reel bases engageable with tape reels housed within said magnetic tape cassette;
   a rotary head means adapted to record and/or reproduce signals on said magnetic tape, said rotary head means being arranged in a position laterally offset from a longitudinally extending center axis extending across a lateral intermediate point between said reel bases;
   second means for extracting a predetermined length of magnetic tape from said magnetic tape cassette and moving said predetermined length of magnetic tape to various positions corresponding to various operation modes of said recording and/or reproducing apparatus, said second means including first and second movable members respectively movable along predetermined first and second paths and thus to various positions for positioning said magnetic tape at one of said various positions corresponding to a selected one of said various operation modes;
   third means for mounting said rotary head means on said recording and/or reproducing apparatus such that the axis of said rotary head means lies oblique to a vertical axis;
   fourth means for driving said recording and/or reproducing apparatus through various modes of operation, said fourth means actuating said second means so as to shift said first and second members along said first and second paths to an extent in accordance with said operational mode of said recording and/or reproducing apparatus; and
   fifth means for applying brakes to said reel bases at various braking magnitudes so as to restrict rotation of said reel bases in a first braking mode, for exerting resistance to rotation of said reel bases but allowing rotation of said reel bases at a limited speed in a second braking mode, and for allowing free rotation of said reel bases in a third braking mode;
   sixth means cooperating said fifth means with said second means, for varying said braking mode among said first, second and third braking modes according to the position of said second means corresponding to the operation mode of said recording and/or reproducing apparatus, said sixth means setting said fifth means at said first braking mode when said first and second movable members are positioned at a second position and at said third braking mode when said first and second movable members are positioned at a third position.

39. A recording and/or reproducing apparatus for a magnetic tape cassette, comprising:
   first means for receiving said magnetic tape cassette to drivingly cooperate therewith, said first means including a pair of reel bases engageable with tape reels housed within said magnetic tape cassette;
   a rotary head means adapted to record and/or reproduce signals on said magnetic tape, said rotary head means being arranged in a position laterally offset from a longitudinally extending center axis extending across a lateral intermediate point between said reel bases;

second means for extracting a predetermined length of magnetic tape from said magnetic tape cassette and moving said predetermined length of magnetic tape to various positions corresponding to various operation modes of said recording and/or reproducing apparatus, said second means including first and second movable members respectively movable along predetermined first and second paths and thus to various positions for positioning said magnetic tape at one of said various positions corresponding to a selected one of said various operation modes;

third means for mounting said rotary head means on said recording and/or reproducing apparatus such that the axis of said rotary head means lies oblique to a vertical axis and in such a manner that first ends of said first and second paths, which first ends of said first and second paths lie adjacent said rotary head means and at which said first and second movable members place said magnetic tape at a loading mode position for recording and reproduction, are arranged on a plane extending through the uppermost point and the lowermost point of the top surface of said rotary head means, and proximal to said first means, whereby the difference between the lengths of maximum stroke of said first and second movable members along said first and second paths can be minimized; and fourth means for driving said recording and/or reproducing apparatus through various modes of operation, said fourth means actuating said second means so as to shift said first and second members along said first and second paths according to said operational mode of said recording and/or reproducing apparatus, said fourth means including a loading motor driven to shift said first and second movable members among various mode positions corresponding to said operational modes of said recording and/or reproducing apparatus, and a power train adapted to move said first and second members of said second means at different speeds so as to compensate for the difference between the strokes of said first and second members.

40. A recording and/or reproducing apparatus for a magnetic tape cassette, comprising:

first means for receiving said magnetic tape cassette to drivingly cooperate therewith, said first means including a pair of reel bases engageable with tape reels housed within said magnetic tape cassette;

a rotary head means adapted to record and/or reproduce signals on said magnetic tape, said rotary head means being arranged in a position laterally offset from a longitudinally extending center axis extending across a lateral intermediate point between said reel bases;

second means for extracting a predetermined length of magnetic tape from said magnetic tape cassette and moving said predetermined length of magnetic tape to various positions corresponding to various operation modes of said recording and/or reproducing apparatus, said second means including first and second movable members respectively movable along predetermined first and second paths and thus to various positions corresponding to a selected one of said various operation modes;

third means for mounting said rotary head means on said recording and/or reproducing apparatus such that the axis of said rotary head means lies oblique to a vertical axis and in such a manner that first ends of said first and second paths, which first ends of said first and second paths lie adjacent said rotary head means and at which said first and second movable members place said magnetic tape at a loading mode position for recording and reproduction, are arranged on a plane extending through the uppermost point and the lowermost point of the top surface of said rotary head means, and proximal to said first means, whereby the difference between the lengths of maximum stroke of said first and second movable members along said first and second paths can be minimized;

fourth means for driving recording and/or reproducing apparatus through said various modes of operation, said fourth means actuating said second means so as to shift said first and second members along aid first and second paths according to said operational mode of said recording and/or reproducing apparatus, said fourth means including as loading motor driven to shift said first and second movable members among various mode positions corresponding to said operational modes of said recording and/or reproducing apparatus, and a power train adapted to move said first and second members of said second means at different speeds so as to compensate for the difference between the strokes of said first and second members; and fifth means for applying brakes to said reel bases at various braking magnitudes so as to restrict rotation of said reel base in a first braking mode, for exerting resistance to rotation of said reel base but allowing rotation of said reel base at a limited speed in a second braking mode, and for allowing free rotation of said reel bases in a third braking mode; and sixth means cooperating said fifth means with said second means, for varying said braking mode among said first, second and third braking modes according to the position of said second means corresponding the operation mode of said recording and/or reproducing apparatus, said sixth means setting said fifth means at said first braking mode when said first and second movable members are positioned at a second position and at said third braking mode when said first and second movable member are positioned at a third position.

41. A recording and/or reproducing apparatus for a magnetic tape cassette, comprising:

first means for receiving said magnetic tape cassette to drivingly cooperate therewith, said first means including a pair of reel bases engageable with tape reels housed within said magnetic tape cassette;

a rotary head means adapted to record and/or reproduce signals on said magnetic tape, said rotary head means being arranged in a position laterally offset from a longitudinally extending center axis extending across a lateral intermediate point between said reel bases;

second means for extracting a predetermined length of magnetic tape from said magnetic tape cassette and moving said predetermined length of magnetic tape to various positions corresponding to various operation modes of said recording and/or reproducing apparatus, said second means including first and second movable members respectively movable along predetermined first and second paths and thus to various positions for positioning said magnetic tape at one of said various positions corresponding to a selected one of said various operation modes;

third means for mounting said rotary head means on said recording and/or reproducing apparatus such that the axis of said rotary head means lies oblique to a vertical axis;

fourth means for driving said recording and/or reproducing apparatus through various modes of operation, said fourth means actuating said second means so as to shift said first and second members along said first and second paths to an extent in accordance with said operational mode of said recording and/or reproducing apparatus; and fifth means for applying a brake to said reel bases at various braking magnitudes so as to restrict rotation of said reel bases in a first braking mode, for exerting resistance to rotation of said reel bases but allowing rotation of said reel bases at a limited speed in a second braking mode, and for allowing free rotation of said reel bases in a third mode;

sixth means comprising a single member cooperating said fifth means with said second means, for varying said braking mode among said first, second and third braking modes according to the position of said second means corresponding to the operation mode of said recording and/or reproducing apparatus, said sixth means setting said fifth means at said first braking mode when said first and second movable members are positioned at a second position essentially corresponding to a recording and reproducing mode position and at said third braking mode when said first and second movable members are positioned at a third position essentially corresponding to a fast feed mode and a rewinding mode.

* * * * *